(12) United States Patent
Callender et al.

(10) Patent No.: US 11,234,172 B2
(45) Date of Patent: Jan. 25, 2022

(54) CONFIGURABLE SHARING BETWEEN INTRA- AND INTER-FREQUENCY MEASUREMENTS

(71) Applicant: Telefonaktiebolaget LM Ericsson (publ), Stockholm (SE)

(72) Inventors: Christopher Callender, Kinross (GB); Joakim Axmon, Limhamn (SE); Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/975,956

(22) PCT Filed: Apr. 4, 2019

(86) PCT No.: PCT/EP2019/058569
§ 371 (c)(1),
(2) Date: Aug. 26, 2020

(87) PCT Pub. No.: WO2019/193125
PCT Pub. Date: Oct. 10, 2019

(65) Prior Publication Data
US 2021/0014751 A1    Jan. 14, 2021

Related U.S. Application Data

(60) Provisional application No. 62/653,029, filed on Apr. 5, 2018.

(51) Int. Cl.
*H04W 36/00* (2009.01)
*H04W 72/04* (2009.01)

(52) U.S. Cl.
CPC ... *H04W 36/0088* (2013.01); *H04W 36/0016* (2013.01); *H04W 36/0058* (2018.08); *H04W 72/0446* (2013.01)

(58) Field of Classification Search
CPC ......... H04W 36/0088; H04W 36/0058; H04W 36/0016; H04W 72/0446; H04W 24/10
See application file for complete search history.

(56) References Cited

U.S. PATENT DOCUMENTS

| | | | | |
|---|---|---|---|---|
| 8,391,861 | B2 * | 3/2013 | Breuer | H04W 36/0088 455/434 |
| 2011/0039546 | A1 * | 2/2011 | Narasimha | H04W 36/305 455/423 |

OTHER PUBLICATIONS

"3GPP TS 36.211 V14.5.0", 3rd Generation Partnership Project; Technical Specification Group Radio Access Network; Evolved Universal Terrestrial Radio Access (E-UTRA); Physical channels and modulation (Release 14), Dec. 2017, pp. 1-197.

(Continued)

*Primary Examiner* — Jamal Javaid
(74) *Attorney, Agent, or Firm* — Murphy, Bilak & Homiller, PLLC

(57) ABSTRACT

Embodiments include methods performed by a user equipment, UE, to schedule a plurality of measurement activities in a wireless network. Such embodiments include obtaining a measurement configuration (e.g., from a network node) relating to first and second groups of measurements, and a gap-sharing ratio between the first and second groups of measurements. Such embodiments also include selecting an analysis period for a measurement schedule, and determining, over the analysis period, measurement load information related to each of the first and second groups within one or more measurement gaps comprising the analysis period. Such embodiments also include determining, based on the measurement load information and the gap-sharing ratio, a measurement schedule for the first and second groups of measurements. Some embodiments include performing measurements according to the determined schedule. Other embodiments include methods performed by network nodes, (Continued)

as well as UEs and network nodes configured to perform the respective methods.

25 Claims, 8 Drawing Sheets

(56) References Cited

OTHER PUBLICATIONS

"Collision between measurement gaps and intra-SMTC(S)", 3GPP TSG-RAN WG4 Meeting #86; R4-1802095; Athens, Greece, Feb. 26-Mar. 2, 2018, pp. 1-6.
"Further Discussion on NR Gap Sharing Design and Applicability", 3GPP TSG-RAN WG4 Meeting #86; R4-1802287; Athens, Greece, Feb. 26-Mar. 2, 2018, pp. 1-8.
"Multi-layer measurement with gaps", 3GPP TSG-RAN WG4#85; R4-1713101; Reno, US, Nov. 27-Dec. 1, 2017, pp. 1-3.
"Scaling for measurements of multiple frequency layers with gaps", 3GPP TSG-RAN WG4 Meeting #85; R4-1712486; Reno, USA, Nov. 27-Dec. 1, 2017, pp. 1-4.
"3GPP TS 36.331 V15.0.1"; 3rd Generation Partnership Project; Technical Specification Group Radio Access Network; Evolved Universal Terrestrial Radio Access (E-UTRA); Radio Resource Control (RRC); Protocol specification (Release 15), Jan. 2018, pp. 1-776.
"3GPP TS 38.211 V15.0.0"; 3rd Generation Partnership Project; Technical Specification Group Radio Access Network; NR; Physical channels and modulation (Release 15), Dec. 2017, pp. 1-73.
"3GPP TS 38.215 V15.0.0"; 3rd Generation Partnership Project; Technical Specification Group Radio Access Network; NR; Physical layer measurements (Release 15), Dec. 2017, pp. 1-13.
"3GPP TS 38.331 V15.1.0"; 3rd Generation Partnership Project; Technical Specification Group Radio Access Network; NR; Radio Resource Control (RRC) protocol specification (Release 15), Mar. 2018, pp. 1-268.
"3GPP TS 38.133 V15.0.0"; 3rd Generation Partnership Project; Technical Specification Group Radio Access Network; NR; Requirements for support of radio resource management (Release 15), Dec. 2017, pp. 1-41.
"3GPP TS 36.133 V15.1.0"; 3rd Generation Partnership Project; Technical Specification Group Radio Access Network; Evolved Universal Terrestrial Radio Access (E-UTRA); Requirements for support of radio resource management Release 15), Dec. 2017, pp. 1-2994.
"3GPP TS 36.214 V15.0.1"; 3rd Generation Partnership Project; Technical Specification Group Radio Access Network; Evolved Universal Terrestrial Radio Access (E-UTRA); Physical layer; Measurements (Release 15), Jan. 2018, pp. 1-9.

* cited by examiner

CONFIGURABLE SHARING BETWEEN INTRA- AND INTER-FREQUENCY MEASUREMENTS

TECHNICAL FIELD

The present application relates generally to the field of wireless communication systems and methods, and more specifically to devices, methods, and computer-readable media that improve measurement scheduling by a device or user equipment (UE) operating in a wireless communication network.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

In addition, LTE Rel-10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 terminal. Each such carrier can be referred to as a Component Carrier (CC). In particular, for early LTE Rel-10 deployments it can be expected that there will be a smaller number of LTE Rel-10-capable terminals compared to many LTE legacy terminals. For an efficient use of a wide carrier also for legacy terminals, legacy terminals can be scheduled in all parts of the wideband LTE Rel-10 carrier. One exemplary way to achieve this is by means of Carrier Aggregation (CA), whereby an LTE Rel-10 terminal can receive multiple CCs, each preferably having the same structure as a Rel-8 carrier.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Furthermore, multi-RAT (radio access technology) dual connectivity (MR-DC) can also be envisioned as an important feature in 5G RAN architectures to deliver enhanced end-user bit rate. One such MR-DC arrangement is commonly referred to as E-UTRAN-NR Dual Connectivity (or EN-DC for short) and identified in 3GPP TS 38.301 as "option 3." In EN-DC, a node providing E-UTRA resources (e.g., LTE eNB) acts as master node (MN, i.e., anchors the UE control-plane connection) and an NR node (e.g., gNB) acts as secondary node (SN) providing additional UP resources.

A UE can perform periodic cell search and measurements of signal power and quality (e.g., reference signal received power, RSRP, and Reference signal received quality, RSRQ) in both Connected and Idle modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN reference signals, UE-specific Reference Signal (DM-RS) associated with PDSCH, Demodulation Reference Signal (DM-RS) associated with EPDCCH or MPDCCH, Positioning Reference Signal (PRS), and CSI Reference Signal (CSI-RS)

UE measurement reports to the network can be configured to be periodic or aperiodic based a particular event. For example, the network can configure a UE to perform measurements on various carrier frequencies and various RATs corresponding to neighbor cells, as well as for various purposes including, e.g., mobility and positioning. The configuration for each of these measurements is referred to as a "measurement object." Furthermore, the UE can be configured to perform the measurements according to a "measurement gap pattern" (or "gap pattern" for short), which can comprise a measurement gap repetition period (MGRP) (i.e., how often a regular gap available for measurements occurs) and a measurement gap length (MGL) (i.e., the length of each recurring gap).

Furthermore, an LTE UE can be configured for intra-frequency measurements, inter-frequency measurements, and inter-radio access technology (inter-RAT) measurements. Even so, since the UE is configured with a single gap pattern, it needs to be used for both intra- and inter-frequency (and/or inter-RAT) measurements if both types of measurements are configured. To facilitate more flexible sharing between the intra- and inter-frequency measurements a configurable sharing parameter was introduced for LTE. In general terms, this technique involves scaling cell detection time and L1 measurement period based on the number of carriers the UE has in its set of measurement objects.

In NR, downlink signals available for UE measurement can occur much more sparsely, or over a longer time period, than in LTE. Applying these LTE E-UTRA measurement gap sharing techniques would in most cases lead to unnecessary long delays in detecting neighbour cells and/or detecting that a particular neighbour cell is a suitable candidate for handover or offloading. As such, applying the above-mentioned LTE measurement-scheduling principles to NR measurement scheduling would have a negative impact on UE mobility and inter-cell load balancing. Ultimately, this can result in degraded network capacity (e.g., number of users), data rates, coverage, and/or end user experience.

Accordingly, there is a need for an improved technique for scheduling measurements according to gap sharing between inter- and intra-frequency measurement objects configured for a single UE, that provides the desired quality of measurements but does not result in such degradations to network performance and/or user experience.

SUMMARY

Accordingly, to address at least some of such issues and/or problems, certain exemplary embodiments of apparatus, devices, methods, and computer-readable media according to the present disclosure can improve measurement-related performance, thereby improving performance of both the UE and the network in scenarios involving concurrent infra- and inter-frequency measurement requirements on a particular UE. Exemplary methods, systems, devices, and computer-readable media according to the present disclosure can utilize configurable gap sharing based on measurement timing configurations to jointly determine the balance between intra-frequency and inter-frequency (or inter-RAT) measurements across available measurement gaps.

One resulting exemplary benefit is the reduction, elimination, and/or avoidance of "wasted" measurement gaps, as explained above, by efficiently adapting to intra- and inter-frequency measurement requirements from the network. For example, these techniques can improve delays (e.g., in cell identification for UE handover) in these scenarios such that handover can be performed before serving cell quality becomes critically low. Another resulting exemplary benefit is that cell offloading can be performed before downlink buffers in the base station overrun. Another resulting exemplary benefit is reduced UE power consumption for measurements. Another resulting exemplary benefit is reducing and/or eliminating degradations to user experience, such as dropped data connections caused by delayed handover due to measurement delays.

Exemplary embodiments include methods and/or procedures scheduling a plurality of measurement activities in a wireless network. These exemplary methods and/or procedures can be performed by a user equipment (UE, e.g., wireless device, or component thereof such as a modem) in communication with a serving network node (e.g., eNB, gNB, ng-eNB, en-gNB, base station, etc., or component thereof).

The exemplary methods and/or procedures can include obtaining a measurement configuration relating to a first group of measurements, a second group of measurements, and a gap-sharing ratio between the first and second groups of measurements. The exemplary methods and/or procedures can also include selecting an analysis period for a measurement schedule, and determining measurement load information related to each of the first and second groups within one or more measurement gaps comprising the analysis period. The exemplary methods and/or procedures can also include determining, based on the measurement load information and the gap-sharing ratio, a measurement schedule for the first and second groups of measurements. In some embodiments, the exemplary methods and/or procedures can include performing the first and second groups of measurements according to the determined schedule.

Other embodiments include exemplary methods and/or procedures for configuring a user equipment (UE, e.g., wireless device, or component thereof such as a modem) to perform a plurality of measurement activities. These exemplary methods and/or procedures can be performed by a network node (e.g., eNB, gNB, ng-eNB, en-gNB, base station, etc., or component thereof) in communication with the UE in a wireless network.

The exemplary methods and/or procedures can include configuring the UE with a measurement configuration relating to a first group of measurements, a second group of measurements, and a gap-sharing ratio between the first and second groups of measurements. The exemplary methods and/or procedures can also include selecting an analysis period for a measurement schedule, and determining measurement load information related to each of the first and second groups within one or more measurement gaps comprising the analysis period. The exemplary methods and/or procedures can also include determining, based on the measurement load information and the gap-sharing ratio, one or more measurement requirements relating to at least a portion of measurements comprising the first and second groups. The exemplary methods and/or procedures can also include determining an updated measurement configuration based on the measurement requirements. In some embodiments, the exemplary methods and/or procedures can include transmitting the updated measurement configuration to the UE.

Other exemplary embodiments include UEs or network nodes configured to perform operations corresponding to the exemplary methods and/or procedures described above. Other exemplary embodiments include non-transitory, computer-readable media storing program instructions that, when executed by at least one processor, configure a UE or a network node to perform operations corresponding to the exemplary methods and/or procedures described above.

These and other objects, features and advantages of the exemplary embodiments of the present disclosure will become apparent upon reading the following detailed description of the exemplary embodiments of the present disclosure, when taken in conjunction with the appended exemplary embodiments.

While the present disclosure will now be described in detail with reference to the figures, it is done so in connection with the illustrative embodiments and is not limited by the particular embodiments illustrated in the figure(s) or in the appended claims.

DETAILED DESCRIPTION

As briefly mentioned above, in NR networks, downlink (DL) signals available for UE measurement can occur much more sparsely, or over a longer time period, than in LTE networks. Applying LTE E-UTRA measurement gap sharing techniques (briefly discussed above) would in most cases lead to unnecessary long delays in detecting neighbour cells and/or detecting that a particular neighbour cell is a suitable candidate for handover or offloading. As such, applying the above-mentioned LTE measurement-scheduling principles to NR measurement scheduling would have a negative impact on UE mobility and inter-cell load balancing. This is discussed in more detail below.

Figure 1:
FIGS. 1a-1c show various exemplary time-frequency configurations of NR synchronization signal and Physical Broadcast Channel (SS/PBCH) blocks (SSBs) usable with various exemplary embodiments of the present disclosure.

An exemplary configuration for an NR synchronization signal and PBCH block (SSB) is illustrated in FIG. 1a. The NR SSB comprises a Primary Synchronization Signal (PSS), a Secondary Synchronization Signal (SSS), a Physical Broadcast Channel (PBCH), and Demodulation Reference Symbols (DM-RS). As also shown in FIG. 1a, an individual SSB spans four adjacent OFDM symbols within a PRB. Multiple SSBs comprise an SSB burst, which is transmitted within a half-frame (e.g., 5 ms). Moreover, within the half-frame, multiple SSBs for different cells or different beams may be transmitted, as illustrated with SSB indices 0-7 in FIG. 1b. The number of SSB locations in a burst depends on the frequency range (e.g., 0-3 or 0-6 GHz as shown in FIG. 1b), as well as on the particular NR radio interface configuration. The SSB burst (hence the individual SSBs) are transmitted according to an SSB measurement timing configuration (SMTC) cycle, which may be 5, 10, 20, 40, 80 or 160 ms, as illustrated in FIG. 1c.

Since the SSBs may be sparse in time, the UE is provided with assistance information that allows it to search in a narrower time window for the signals of interest. This time window is denoted by SMTC. A UE can be configured by a network node (e.g., eNB, gNB, or base station) with an SMTC window (or "SMTC" for short) for each NR carrier to be measured. The SMTC can include parameters such as, e.g., periodicity, duration, and time offset. The SMTC time offset can be expressed as a number of subframes, each of length 1 ms, within the range 0 to SMTC period-1, and uses the frame border of system frame number 0 of the serving cell as reference.

The UE is not expected to search for, or measure, SSBs outside of the indicated SMTC window(s). For inter-frequency measurements, an SMTC is indicated per frequency layer, while for intra-frequency layer, two SMTCs may be indicated, such as a first SMTC which may be considered to be a default SMTC, and a second SMTC associated with a list of physical cell IDs (PCI) to which the second SMTC applies. The first and second SMTC for intra-frequency measurements differ only by SMTC periodicity.

As briefly mentioned above, SSB measurements can be denoted as intra- or inter-frequency measurements. An SSB-based measurement is referred to as intra-frequency if: 1) the carrier center frequency of the SSB of the serving cell indicated for measurement and the carrier center frequency of the SSB of the neighbor cell are the same; and 2) the subcarrier spacing of the two SSB are also the same. A UE can perform intra-frequency SSB based measurements without measurement gaps if the following conditions are met: 1) the SSB is completely contained in the downlink operating bandwidth of the UE, and 2) the SSB has the same subcarrier spacing as the downlink data transmission to the UE.

Even when an intra-frequency SSB measurement may be performed without measurement gaps, there are certain scenarios in which so-called scheduling restrictions may apply to the measurement. For example, UEs are required to be capable of measuring without measurement gaps when the SSB is completely contained in the UE's active bandwidth part (BWP). When the measurement signal has a different subcarrier spacing than physical downlink shared channel (PDSCH)/physical downlink control channel (PDCCH) and on frequency range 2 (FR2), there are additional restrictions on the scheduling availability, as described below. However, there are no scheduling restrictions due to measurements performed with a same subcarrier spacing as PDSCH/PDCCH on frequency range 1 (FR1).

Similarly, for UEs that support intraCarrierConcurrentMeas (simultaneousRxDataSSB-DiffNumerology), there are no restrictions on scheduling availability due to measurements. The field specified in 3GPP TS 38.306 called intraCarrierConcurrentMeas or simultaneousRxDataSSB-DiffNumerology, indicates whether the UE supports concurrent intra-frequency measurement on serving cell or neighboring cell and PDCCH or PDSCH reception from the serving cell with a different numerology.

For UEs that do not support intraCarrierConcurrentMeas, however, the following restrictions apply due to SS-RSRP/RSRQ/signal-to-interference and noise ratio (SINR) measurement:

If useServingCellTimingForSync is enabled, the UE is not expected to transmit PUCCH/PUSCH or receive PDCCH/PDSCH on: 1) SSB symbols to be measured, and 2) one data symbol before and one data symbol after each consecutive SSB symbols within SMTC window duration.

If useServingCellTimingForSync is not enabled, the UE is not expected to transmit physical uplink control channel (PUCCH)/physical uplink shared channel (PUSCH) or receive PDCCH/PDSCH on all symbols within SMTC window duration.

The field useServingCellTimingForSync or deriveSSBIndexFromCell, as specified in 3GPP TS 38.133 V15.2.0, indicates, for intra-frequency measurements, whether the UE can utilize serving cell timing to derive the index of SS block transmitted by neighbor cell. For inter-frequency measurements, this field indicates whether the UE may use the timing of any detected cell on that target frequency to derive the SSB index of all neighbor cells on that frequency. When intraband carrier aggregation is performed, the scheduling restrictions apply to all serving cells on the band.

Similarly, for UEs performing measurements in FR2 frequency range, the following restrictions apply for the various measurements (based on the assumption that useServingCellTimingForSync is always enabled for FR2):

For SS-RSRP or SS-SINR measurement on an FR2 intra-frequency cell, the UE is not expected to transmit PUCCH/PUSCH or receive PDCCH/PDSCH on: 1) SSB symbols to be measured, and 2) one data symbol before and one data symbol after each consecutive SSB symbols within SMTC window.

For SS-RSRQ measurement on an FR2 intra-frequency cell, the UE is not expected to transmit PUCCH/PUSCH or receive PDCCH/PDSCH on: 1) SSB symbols to be measured; 2) Received signal strength indicator (RSSI) measurement symbols; and 3) one data symbol before and one data symbol after each consecutive SSB/RSSI symbols within SMTC window.

When intraband carrier aggregation is performed, the scheduling restrictions apply to all serving cells on the band.

Similarly, an SSB-based measurement is referred to as inter-frequency if: 1) the carrier center frequency of the SSB of the serving cell indicated for measurement and the carrier center frequency of the SSB of the neighbour cell are not the same; or 2) the subcarrier spacing of the two SSB are not the same. A baseline UE will normally be provided with measurement gaps to perform inter-frequency measurements, during which it can retune its radio frequency (RF) receiver and/or modify the sampling rate and/or receiver bandwidth to receive with a different center frequency or subcarrier spacing.

Measurements are referred to as inter-RAT if they are performed: 1) on a different radio access technology (RAT) such as UMTS, LTE, GSM, CDMA200, WLAN etc; and 2) typically performed in measurement gaps by a UE as they may involve retuning RF and reconfiguring baseband receiver to accommodate the different RAT. In view of the above explanations, NR neighbor cell measurements can be categorized based on their impact to a serving cell, such as:

1) Measurement type A: Intra-frequency measurement without measurement gap (MG) and without interruption
   For FR1, no mixed numerologies are assumed for this measurement type
   For FR2, this measurement type is not applicable
2) Measurement type B: intra-frequency measurement with interruption
   For FR1, mixed numerologies are assumed for this measurement type
   For FR2, Rx beam sweeping is assumed for this measurement type
3) Measurement type C: intra-frequency measurement with MG
   e.g., Intra-frequency measurement outside active BWP
4) Measurement type D: inter-frequency measurement and inter-RAT measurement The measurement gap patterns for EN-DC (also referred to as non-standalone (NSA) NR operation, in which the UE simultaneously is connected to an E-UTRA serving cell and a NR serving cell, are listed in Table 1, which is defined in 3GPP TS 38.133. As shown in Table 1, the periodicity of a gap pattern (i.e., measurement gap repetition period, MGRP)—is 20, 40, 80 or 160 ms, and the measurement gap length (MGL) is 1.5, 3, 3.5, 4, 5.5 or 6 ms.

TABLE 1

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| FFS: [4] | [6] | [20] |
| [5] | 6 | 160 |
| FFS: [6] | [4] | [20] |
| [7] | 4 | 40 |
| [8] | 4 | 80 |
| [9] | [4] | [160] |
| [10] | 3 | 20 |
| [11] | 3 | 160 |
| FFS: [12] | [5.5] | [20] |
| [13] | [5.5] | 40 |
| [14] | [5.5] | 80 |
| [15] | [5.5] | 160 |
| [16] | [3.5] | 20 |
| [17] | [3.5] | 40 |
| [18] | [3.5] | 80 |
| [19] | [3.5] | 160 |
| [20] | [1.5] | 20 |
| [21] | [1.5] | 40 |
| [22] | [1.5] | 80 |
| [23] | [1.5] | [160] |

For NSA operation, the network can configure the UE according to two different options: 1) "per-UE gap", a single gap pattern to be used for all E-UTRA and NR inter-frequency measurements and/or NR intra-frequency measurements outside the active NR bandwidth part (BWP); or 2) "per-frequency range (FR) gaps" of two frequency-specific gap patterns, where one gap pattern applies to LTE and frequency range 1 (FR1) (e.g., below ~6 GHz) NR serving cells, and allows measurement of FR1 inter-frequency measurement objects, and the other gap pattern applies to frequency range 2 (FR2) (e.g., above ~24 GHz) NR serving cells and allows measurement of FR2 NR inter-frequency measurement and/or NR intra-frequency measurement outside the active BWP. It is a UE capability whether to support per-UE gaps or per-FR gaps, although UEs that support per-FR gaps can be configured with either per-UE or per-FR gaps. Table 2 below (also from 3GPP 38.133) shows the applicability of different gap patterns in Table 1 for NSA operation.

TABLE 2

| Measurement gap pattern configuration | Serving cell | Measurement Purpose | Applicable Gap Pattern Id |
| --- | --- | --- | --- |
| Per-UE measurement gap | E-UTRA + FR1, or E-UTRA + FR2, or E-UTRA + FR1 + FR2 | non-NR RAT Note1 | 0, 1, 2, 3 |
| | | FR1 and/or FR2 | 0-11 |
| | | non-NR RAT and FR1 and/or FR2 | 0, 1, 2, 3 |
| Per FR measurement gap | E-UTRA and, FR1 if configured FR2 if configured | non-NR RAT | 0, 1, 2, 3 |
| | | | No gap |
| | E-UTRA and, FR1 if configured FR2 if configured | FR1 only | 0-11 |
| | | | No gap |
| | E-UTRA and, FR1 if configured FR2 if configured | FR2 only | No gap |
| | | | 12-23 |
| | E-UTRA and, | non-NR RAT | 0, 1, 2, 3 |

TABLE 2-continued

| Measurement gap pattern configuration | Serving cell | Measurement Purpose | Applicable Gap Pattern Id |
|---|---|---|---|
| | FR1 if configured FR2 if configured | and FR1 | No gap |
| | E-UTRA and, FR1 if configured FR2 if configured | FR1 and FR2 | 0-11 12-23 |
| | E-UTRA and, FR1 if configured FR2 if configured | non-NR RAT and FR2 | 0, 1, 2, 3 12-23 |
| | E-UTRA and, FR1 if configured FR2 if configured | non-NR RAT and FR1 and FR2 | 0, 1, 2, 3 12-23 |

Note:
if GSM or UTRA TDD or UTRA FDD inter-RAT frequency layer is configured to be monitored, only measurement gap pattern #0 and #1 can be used for per-FR gap in E-UTRA and FR1 if configured, or for per-UEgap.
NOTE1:
Non-NR RAT includes E-UTRA, UTRA and/or GSM.

The measurement gap patterns for standalone (SA) NR operation, in which all the serving cells to which the UE is connected belong to the NR RAT, are the same as for NSA operation shown in Table 1. However, Table 3 shows the applicability for standalone (SA) operation, which is different than the applicability for NSA operation shown in Table 2.

TABLE 3

| Measurement gap pattern configuration | Serving cell | Measurement Purpose | Applicable Gap Pattern Id |
|---|---|---|---|
| Per-UE measurement gap | FR1, or FR1 + FR2 | E-UTRA only | 0, 1, 2, 3 |
| | | FR1 and/or FR2 | 0-11 |
| | | E-UTRAN and FR1 and/or FR2 | 0, 1, 2, 3 |
| | FR2 | E-UTRA only | 0, 1, 2, 3 |
| | | FR1 only | 0-11 |
| | | FR1 and FR2 | 0-11 |
| | | E-UTRAN and FR1 and/or FR2 | 0, 1, 2, 3 |
| | | FR2 only | 12-23 |
| Per FR measurement gap | FR1 if configured FR2 if configured | E-UTRA only | 0, 1, 2, 3 No gap |
| | FR1 if configured FR2 if configured | FR1 only | 0-11 No gap |
| | FR1 if configured FR2 if configured | FR2 only | No gap 12-23 |
| | FR1 if configured FR2 if configured | E-UTRA and FR1 | 0, 1, 2, 3 No gap |
| | FR1 if configured FR2 if configured | FR1 and FR2 | 0-11 12-23 |
| | FR1 if configured FR2 if configured | E-UTRA and FR2 | 0, 1, 2, 3 12-23 |
| | FR1 if configured FR2 if configured | E-UTRA and FR1 and FR2 | 0, 1, 2, 3 12-23 |

When category-M1 UEs were introduced to 3GPP LTE specifications, retuning was necessary for intra- and inter-frequency measurements due to the limited capabilities of these UEs. As such, measurement gaps were also necessary for both types of measurements. Since the UE is configured with a single gap pattern, it needs to be used for both intra- and inter-frequency measurements if both types of measurements are configured. To facilitate more flexible sharing between the intra- and inter-frequency measurements a configurable sharing parameter was introduced for LTE M1 UEs, an example of which is determined according to complementary parameters:

$$K_{inter\_M1\_NC} = \frac{N_{freq} * 100}{(100 - X)} \text{ and } K_{intra\_M1\_NC} = 100/X,$$

where X is signaled by the radio resource control (RRC) parameter measGapSharingScheme [per 3GPP TS 36.331] and is defined according to Table 8.13.2.1.1.1-2 of 3GPP TS 36.133 (repeated below as Table 4), and $N_{freq}$ is the total number of inter-frequency layers to be monitored as defined in section 8.1.2.1.1 of 36.133. When inter-frequency measurement is not configured, $K_{intra\_M1\_NC}=1$ regardless whether or how parameter measGapSharingScheme is configured.

TABLE 4

| measGapSharingScheme | Value of X (%) |
|---|---|
| '00' | $\frac{100}{N_{freq} + 1}$ |
| '01' | 40 |
| '10' | 50 |
| '11' | 60 |

Inter-frequency RRM (radio resource management) delay requirements (cell identification and measurement period) are scaled by the single factor, $K_{inter\_M1\_EC}$, and intra-frequency RRM delay requirements are scaled by the single factor, $K_{intra\_M1\_NC}$. In practice, a UE is expected to be able to meet such requirements if, overall, it uses X % of the available measurement gaps for making intra-frequency measurements, and (100−X) % for making inter-frequency measurements.

Although the existing configurations represented by the tables above specify the configurations and applicability for individual measurements, they do not address the problem of "measurement gap sharing" between multiple configured measurement objects. More specifically, existing approaches do not address the interaction in NR between measurement gap (MG) pattern, SMTC patterns, and the gap sharing parameter. In LTE, CRS (cell reference signal) and PSS/SSS is transmitted such that measurements of any frequency layer could be performed in any measurement gap, since CRS are available in all subframes and at least one instance of PSS/SSS would always be guaranteed to be covered by any gap. Furthermore, it is a UE implementation issue to determine which frequency layer or which measurement object to measure in any given gap. As such, in previous approaches, it is relatively straightforward to allocate X % of the gaps to intra-frequency measurement and (100−X) % to inter-frequency measurement.

Figure 2:
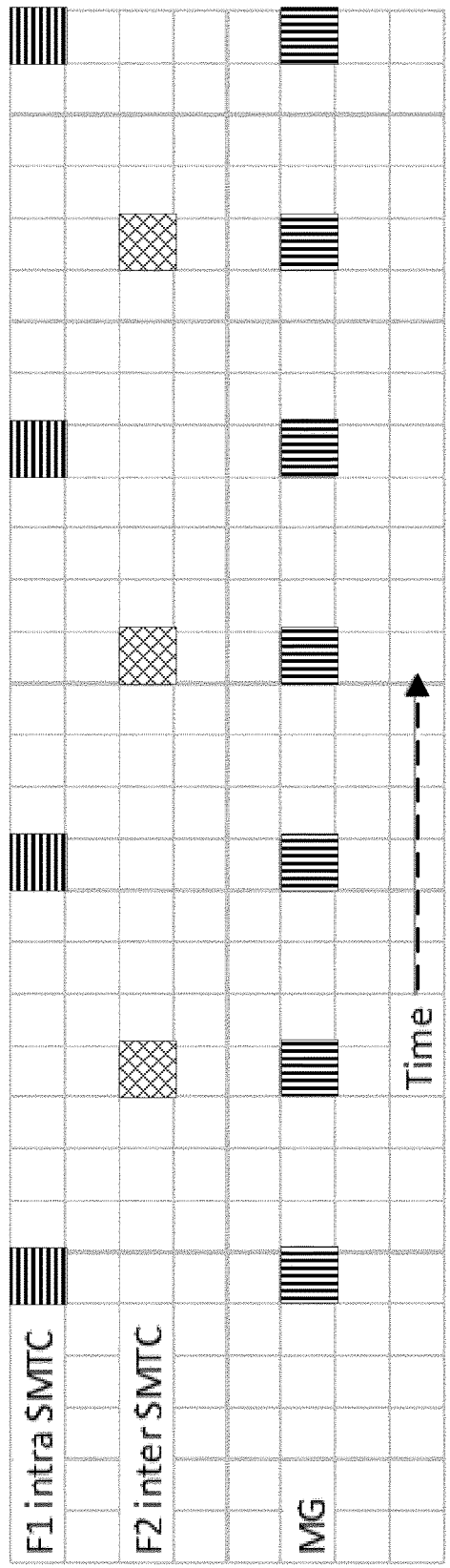
FIG. 2 is a timing diagram of example scenario involving fully non-overlapping SSB measurement timing configurations (SMTCs) for measurements on a carrier frequency 1 (F1) and a carrier frequency 2 (F2).

For an NR UE to attempt a measurement (e.g., for a measurement object) in a MG corresponding to that measurement's SMTC, the network must provide MGs which coincide with the SMTC. Even so, this does not guarantee that each measurement can be performed in each measurement gap. FIG. 2 shows a timing diagram of example scenario involving fully non-overlapping SMTCs for measurements on F1 and F2. In this example, both F1 and F2 can be measured, but there is no gap in which the UE has a choice about which measurement object to measure. Hence, the UE has 50% of available gaps that could be used to measure F1 and the other 50% can be used to measure F2, such that the gap sharing parameter, X, is irrelevant.

Figure 3:
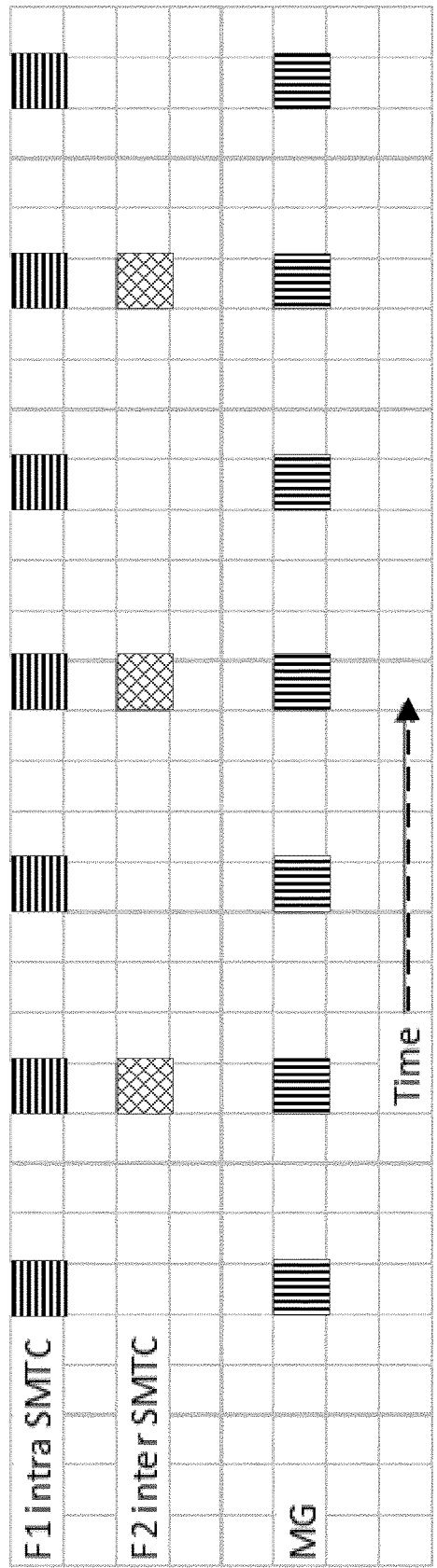
FIG. 3 is a timing diagram of another example scenario involving partially overlapping SMTCs for measurements on F1 and F2.

FIG. 3 shows a timing diagram of another example scenario involving partially overlapping SMTCs for measurements on F1 and F2. For example, the diagram in FIG. 3 can represent the following configuration:

F1: Intra-frequency, 40 ms SMTC periodicity, 0 ms SMTC offset, 5 ms SMTC duration F2: Inter-frequency, 80 ms SMTC periodicity, 40 ms SMTC offset, 5 ms SMTC duration MG: Gap pattern ID 0 (MGL=6 ms, MGRP=40 ms), 0 ms offset In this example, there are some MGs during which the UE has a choice to measure F1 or F2. But for other MGs, only F1 can be measured, so it would be impossible for the UE to comply with a value of, e.g., X=40%. Such a value also implies that the UE should use 60% of MGs for inter-frequency measurements, while but the UE can at most use only 50% of all gaps, i.e., the gaps having SMTC availability on F2.

Figure 4:
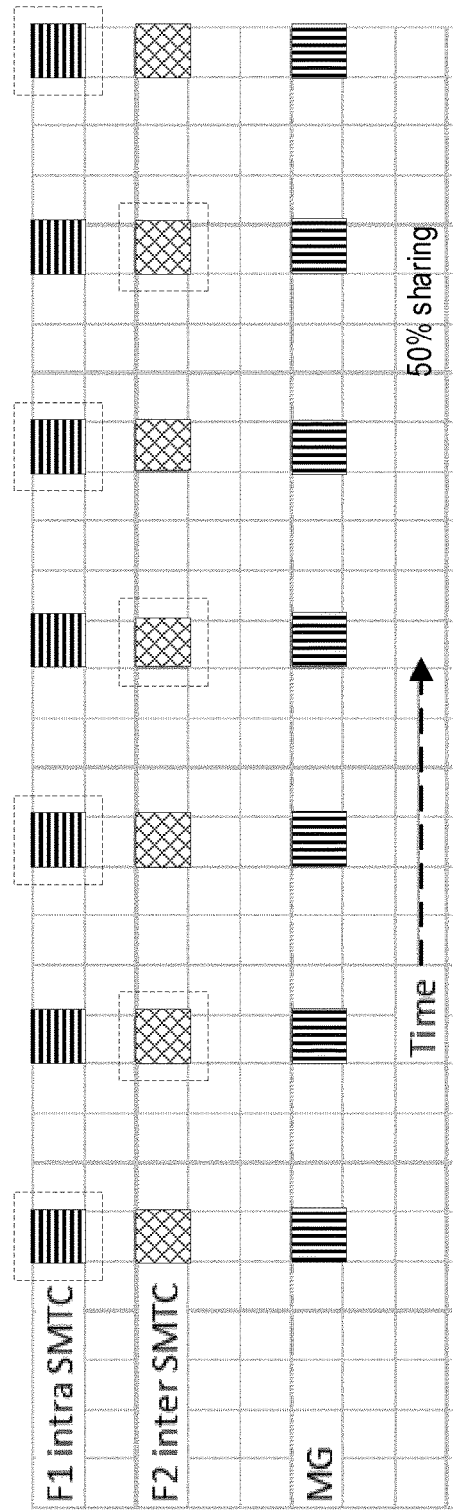
FIG. 4 is a timing diagram of another example scenario involving fully overlapping SMTCs for measurements on F1 and F2.

FIG. 4 shows a timing diagram of another example scenario involving fully overlapping SMTCs for measurements on F1 and F2. In this scenario, which is similar to the LTE scenario discussed above, all of the gaps are usable for inter-frequency (F2) and intra-frequency (F1) measurements. As such, the UE can then choose which object to measure in each gap according to the indicated X % and (100–X) % ratios. In the example shown in FIG. 4, X=50 and the dashed boxes indicate the measurement object selected in each gap.

One approach suggested to address the problems illustrated by FIGS. 2 and 3 is to first partition the available MGs in a static way, according to the gap sharing ratio X % and (100–X) %, and then use the partitioned gaps for the respective intra- and inter-frequency measurements. There are at least two major drawbacks with this approach. First, once the MG are partitioned, the UE may not be able to measure at least one of the measurement objects at all. Second, even if UE is able to measure an object in each gap, there may be wasted gaps that could have been used for a particular measurement purpose, but because of the fixed partitioning, the SMTC that are candidates to measure do not occur in that gap.

Figure 5:
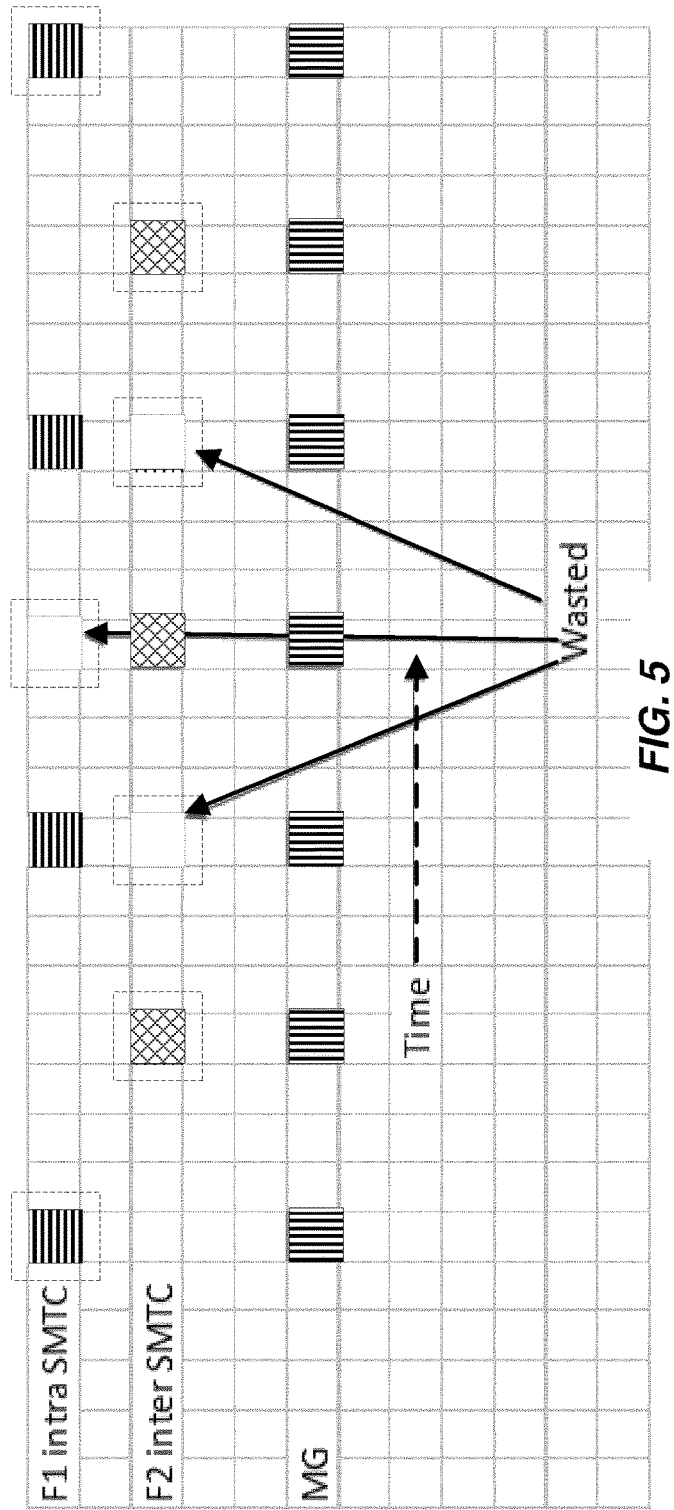
FIG. 5 is a timing diagram of another example scenario involving fixed allocation of measurement gaps between SMTCs for F1 and F2 measurements.

These drawbacks are illustrated by the timing diagram of another exemplary scenario, shown in FIG. 5. In this example, one-third of the gaps are allocated for F1 intra measurements and two-thirds of the gaps are allocated for inter F2 measurements. The configuration of MG and SMTC is the same as FIG. 2, and the dashed boxes illustrate one possible way how the UE has allocated the 1:2 sharing ratio. Although in this example the UE has managed to measure F1 and F2 in the expected ratios of 1/3 and 2/3, this has been achieved by wasting many measurement gaps. By configuring a gap for measurement (e.g., on F2), the UE is unable to transmit and/or receive in another carrier (e.g., F1) during that gap, even if the configured gap is not utilized for F2 due to no available SMTC for F2. As such, in these so-called "wasted" gaps, the UE can neither measure on F2 nor transmit/received on another carrier, such as F1, even if an SMTC or other opportunity is available during that time. As such, such fixed-ratio configuration of measurement gaps, independent of SMTCs, creates significant loss in terms of the UE's transmit and/or receive opportunities.

Exemplary embodiments of the present apply a gap sharing ratio flexibly, on a gap-by-gap basis depending on the number of intra-frequency measurement objects and the number of inter-frequency measurement objects that can be measured in that gap. Expressed more formally, if j=0, 1, 2, . . . J–1 is a gap index, then in each gap j, the SMTC configuration may allow measurement of $N_{intra,j}$ intra-frequency measurement objects and $N_{inter,j}$ inter-frequency or inter-RAT measurement objects. If $N_{intra,j} \geq 1$ and $N_{intra,j} \geq 1$ for a given gap j, then in that particular gap it is possible to do gap sharing, and the configured gap sharing ratio is applied in this gap. However, if both conditions are not true for gap j, then the configured gap sharing ratio is not applied in that gap.

Figure 6:
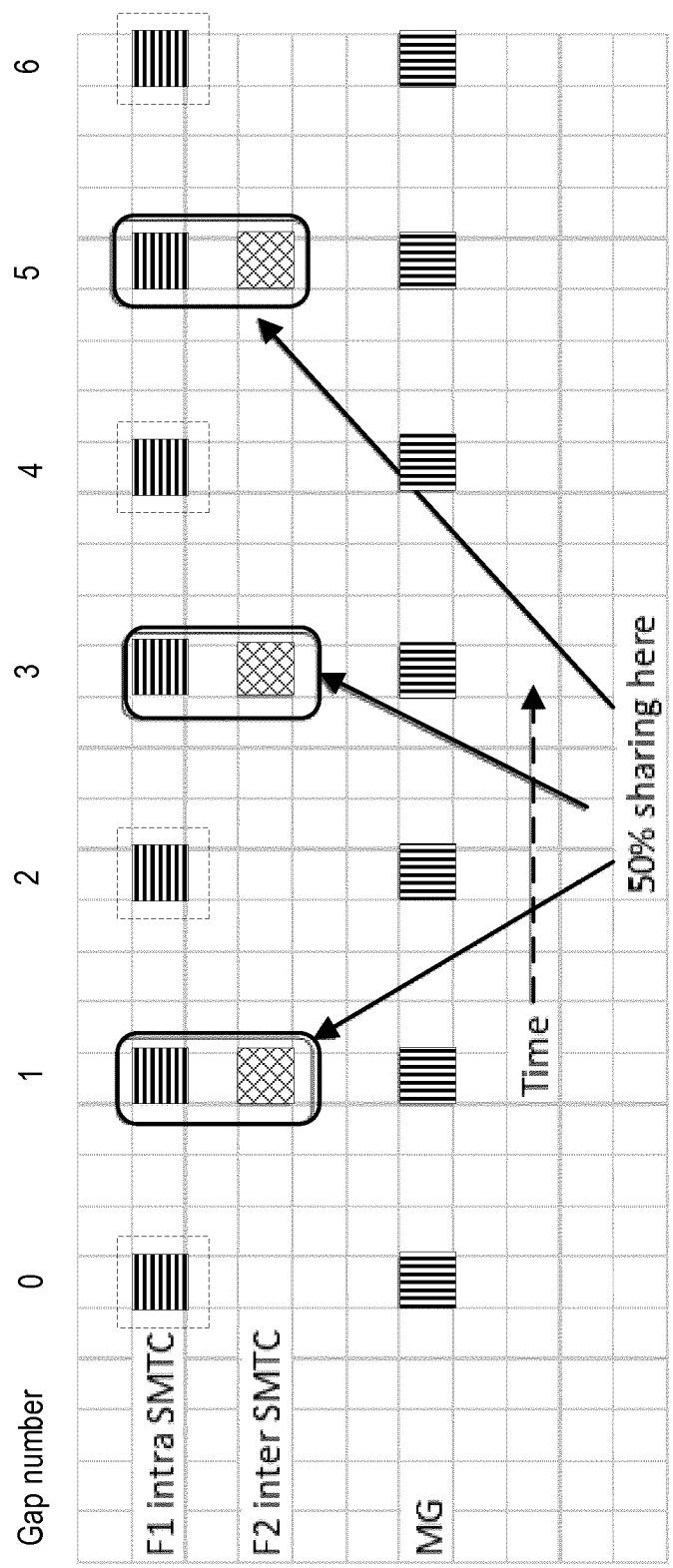
FIG. 6 is a timing diagram of another example scenario illustrating flexible allocation of measurement gaps between SMTCs for F1 and F2 measurements, according to various exemplary embodiments of the present disclosure.

FIG. 6 is a timing diagram of another example scenario illustrating flexible allocation of measurement gaps between SMTCs for F1 and F2 measurements, according to one or more exemplary embodiments of the present disclosure. For this example, it is assumed that X=50% gap sharing is configured. In FIG. 6, the flexible gap sharing is applied in gaps 1, 3, 5, etc. where SMTCs are configured for both F1 (intra) and F2 (inter) measurements. In contrast, gaps 0, 2, 4, 6, etc. are always used for intra-frequency measurement, as indicated by the dashed boxes. Since this 100% utilization affects the overall gap sharing ratio, X, less than 50% (e.g., 25%) of gaps 1, 3, 5, etc. will be used for intra-frequency measurements, and more than 50% (e.g., 75%) of these gaps will be used for intra-frequency measurements. In this manner, both the respective SMTC configurations (which affect how much the different measurement opportunities overlap) and the overall gap sharing parameter X (e.g., 50%) both are used to determine the balance between intra-frequency and inter-frequency (or inter-RAT) measurements, and to schedule particular measurements in particular gaps accordingly.

One exemplary benefit illustrated by FIG. 6 is no wasted gaps, in contrast to the conventional approach illustrated by FIG. 4. In addition, intra-frequency and inter-frequency/inter-RAT measurement delay requirements can be well defined (e.g., bounded) depending on the number of configured carriers, the configured SMTC for the measurement objects, the measurement gap pattern and the configured gap sharing parameter, X. Furthermore, exemplary embodiments provide the ability to dynamically decide, based on a determined share, which measurements to perform in the current gap, without the need for predicting future gaps. This can be important because measurement configuration/reconfiguration can be quite dynamic, and that different measurements can require different numbers of samples and therefore have different measurement periods.

The exemplary embodiments can also provide benefits via application to subgroups of measurements within each group. For example, a separate share Y may be configured for RLM (a first subgroup) and other intra-frequency measurements (a second subgroup), both of which can be part of a first group of intra-frequency measurements for which share X is configured to control the share between the first group and all other measurements (e.g., a second group).

Figure 7:
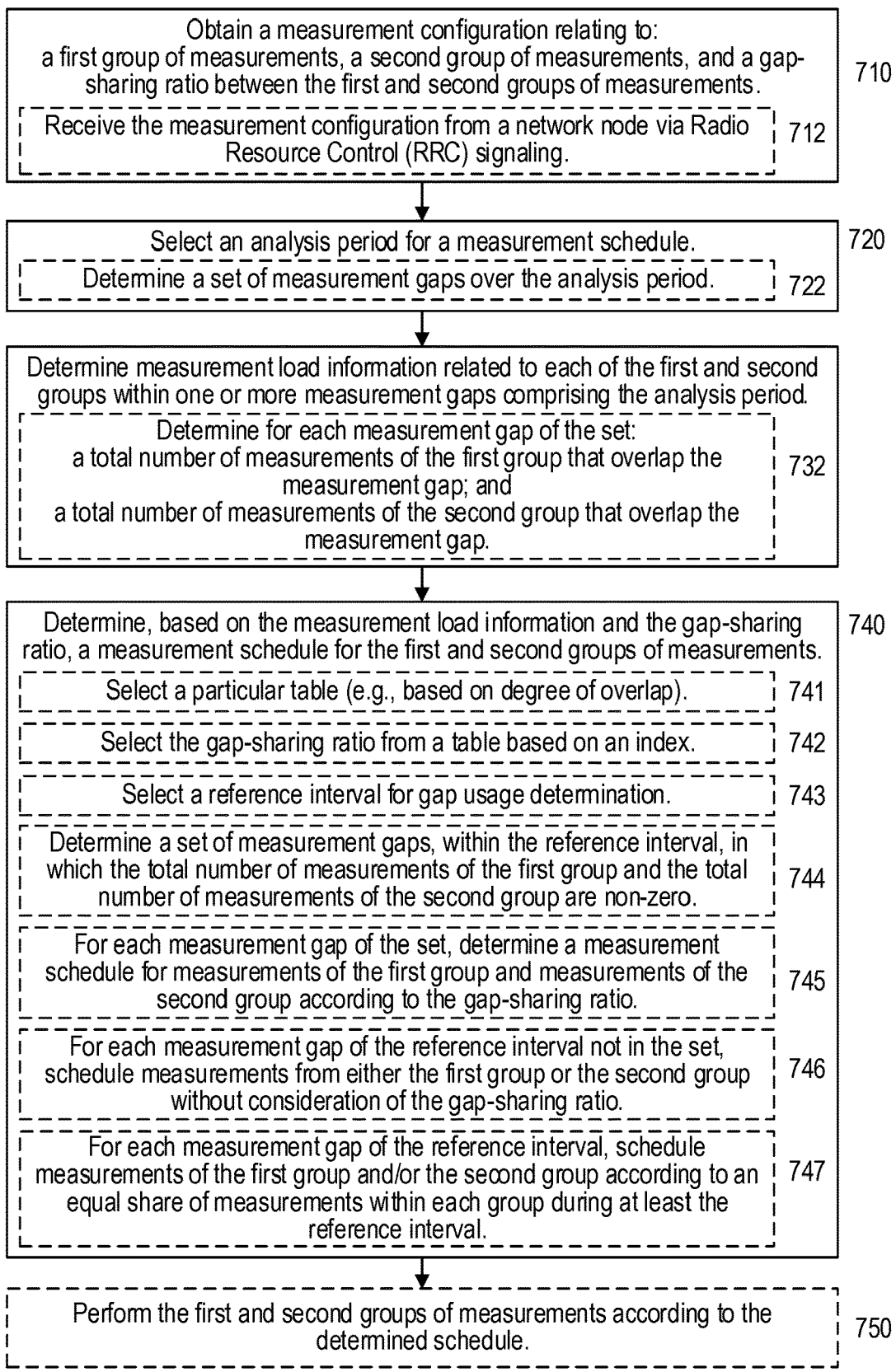
FIG. 7 is a flow diagram of an exemplary method and/or procedure performed by a user equipment (UE) for scheduling a plurality of measurement activities, according to various exemplary embodiments of the present disclosure.

FIG. 7 is a flow diagram of an exemplary method and/or procedure for scheduling a plurality of measurement activities in a wireless network, according to one or more exemplary embodiments of the present disclosure The exemplary method and/or procedure shown in FIG. 7 can be performed by a user equipment (UE, e.g., wireless device, or component thereof such as a modem) in communication with a serving network node (e.g., eNB, gNB, ng-eNB, en-gNB, base station, etc., or component thereof) as shown in or described in relation to other figures herein. As explained below, the exemplary method and/or procedure shown in FIG. 7 can be utilized cooperatively with the exemplary method and/or procedures shown in FIG. 8 to achieve exemplary benefits and/or advantages described herein. Although FIG. 7 shows blocks in a particular order, this order is merely exemplary and the operations shown in FIG.

7 can be performed in a different order than shown, and can be combined and/or divided into blocks having different functionality.

In block 710, the UE can obtain a measurement configuration relating to: a first group of measurements (e.g., SMTCs for infra-frequency measurements), a second group of measurements (e.g., SMTCs for inter-frequency and/or inter-RAT measurements), and a gap-sharing ratio (e.g., X) between the first and second groups of measurements. In some embodiments, the UE can receive the measurement configuration via Radio Resource Control (RRC) signaling from the serving network node. In some embodiments, the measurement configuration can also include a measurement gap repetition period (MGRP) relating to gaps for performing the first and second groups of measurements.

In some embodiments, the received measurement configuration can include an index relating to one or more tables, each table comprising a plurality of gap-sharing ratio values. For example, the gap-sharing ratio can be signaled as an index (e.g., one or more bits) to a particular ratio, with a single set of values (e.g., for all SMTCs) understood by both the UE and network node, such as the exemplary index shown in Table 5 below.

TABLE 5

| Network signalling ParameterName (to be determined by RAN2) | Value of X (%) |
| --- | --- |
| 00 | Equal split |
| 01 | 25% |
| 10 | 50% |
| 11 | 75% |

In other exemplary embodiments, at least two sets of values (e.g., a plurality of tables) of gap sharing parameter X can be specified. For example, two different sets of values of X can be expressed in terms of two different tables, e.g., Tables 6-1 and 6-2 shown below. The UE can select one of the gap sharing tables for sharing gaps between intra-frequency and inter-frequency/inter-RAT measurements based on various factors including, e.g., whether the SMTCs of different carriers configured for measurements overlap or not. For example, if SMTCs of different carriers fully overlap (e.g., as shown in FIG. 4), then the UE can select Table 6-1 and use it to determine the value of X from the two-bit index that is signaled to the UE by the network node. On the other hand, if the SMTCs of different carriers do not overlap in all the gaps (e.g., as shown in FIG. 3) then the UE selects Table 6-2 and uses it to determine the value of X.

TABLE 6-1

| Network signalling ParameterName (to be determined by RAN2) | Value of X (%) |
| --- | --- |
| 00 | Equal split |
| 01 | 40% |
| 10 | 60% |
| 11 | 80% |

TABLE 6-2

| Network signalling ParameterName (to be determined by RAN2) | Value of X (%) |
| --- | --- |
| 00 | Equal split |
| 01 | 20% |
| 10 | 40% |
| 11 | 60% |

The UE receives SMTC configurations of all the carriers for measurements as well as the gap configuration, it can determine whether or not SMTCs of different carriers overlap in the measurement gaps. The example in Table 6-2 above is more suitable for fair sharing of gaps if predominantly some of the SMTCs of the intra-frequency carrier don't overlap with any of the SMTCs of the inter-frequency carriers (i.e. scenario shown in FIG. 3).

However, in another scenario, all SMTCs of intra-frequency carrier can overlap with at least some of the SMTCs of the inter-frequency carriers, while some of the SMTCs of at least one inter-frequency carrier do not overlap with any other SMTC. This scenario preferably utilizes a different gap sharing arrangement than those in Tables 6-1 and 6-2, such as the one shown in Table 6-3 below. In other words, the UE can use Table 6-1 when SMTCs of all carriers used for measurements overlap. If at least some of the SMTCs of intra-frequency carriers do not overlap with SMTCs of inter-frequency carriers in some of the gaps while SMTCs of all inter-frequency carriers overlap with those of the intra-frequency carrier, then the UE can select Table 6-2 for determining the value of X. On the other hand, if at least some of the SMTCs of inter-frequency carriers do not overlap with SMTCs of intra-frequency carriers while all SMTCs of intra-frequency carrier overlap with at least some of the inter-frequency carrier in some of the gaps, then the UE can select Table 6-3 for determining the value of X according to the index.

TABLE 6-3

| Network signalling ParameterName (to be determined by RAN2) | Value of X (%) |
| --- | --- |
| 00 | Equal split |
| 01 | 60% |
| 10 | 70% |
| 11 | 85% |

In yet another possible scenario, some of the intra-frequency SMTCs may not overlap with any other SMTC in some gaps, some of the SMTCs of one or more inter-frequency carriers may not overlap with any other SMTC in some gaps, while some of the gaps may contain SMTCs of intra-frequency and one or more inter-frequency carriers. In this case the UE may select the gap sharing Table 6-1, or another predefined table not shown (e.g., a "Table 6-4").

In yet another exemplary scenario, the same measurement gap contains either SMTC of intra-frequency or an SMTC of any inter-frequency carrier, but not both. In other words, SMTCs of intra-frequency and SMTCs of inter-frequency carriers are orthogonal in time (i.e. no collisions in time). In this case a rule regarding the use of the gap sharing parameter (X) can be pre-defined to prevent erroneous UE behavior. For example, it can be pre-defined that under such scenario the UE shall not apply any gap sharing parameter, such that the UE can measure on intra-frequency and inter-frequency carriers on gaps where their SMTCs are configured.

In block 720, the UE can select an analysis period for a measurement schedule. For example, the UE can select an analysis period based on the periodicities of the sets of signals involved (e.g., the respective MGRP configurations) and/or based on some fixed value (e.g., 480 ms as in LTE). The analysis period can be selected such that it covers at least the longest periodicity of the sets of periodic signals onto which measurements are to be conducted. As an example of the above selection principles, the analysis period can be selected as a fixed value according to the set of signals involved, with the fixed value being a common multiple of the periodicities of these signals. In this manner, the fixed value can cover the longest periodicity.

The analysis period can alternatively be referred to as a gap utilization repetition period (GURP), and can be defined as the least common multiple (LCM) of the periods of: 1) the sets of periodic signals to be used for mobility measurements (if any); 2) the sets of periodic signals to be used for positioning measurements (if any); and 3) the MGRP. In other words:

$$\text{GURP}=\text{LCM}(\text{MGRP}, T_{SMTC\ \#0}, T_{SMTC\ \#1}, \ldots, T_{PRS\ \#0}, T_{PRS\ \#1}, \ldots),$$

where $T_{SMTC\ \#0}$, $T_{SMTC\ \#1}$, etc are SMTC periods {5, 10, 20, 40, 80, 160 ms} for the different carriers onto which mobility measurements are to be conducted; $T_{PRS\ \#0}$, $T_{PRS\ \#1}$, etc. are PRS periods {5, 10, 20, 40, 80, 160, 320, 640, 1280 ms} for carriers onto which positioning measurements are to be conducted; and MGRP is the configured measurement gap repetition period {20, 40, 80, 160 ms}. In case E-UTRA mobility measurements are to be carried out, those may for instance be modelled in the expression above as having an SMTC period of for example 5 ms, 10 ms, etc.

If the periodicities for signals as well as for the measurement gap pattern are related to each other by powers of two, the above expression simplifies to the longest period of: 1) the sets of periodic signals to be used for mobility measurements (if any); 2) the sets of periodic signals to be used for positioning measurements (if any); and 3) the MGRP. In other words, the GURP can be determined as:

$$\text{GURP}=\text{Max}(\text{MGRP}, T_{SMTC\ \#0}, T_{SMTC\ \#1}, \ldots, T_{PRS\ \#0}, T_{PRS\ \#1}, \ldots).$$

Other examples of periodic signals used for measurements include discovery reference signals (DRS) on E-UTRA carrier with frame structure type #3 (FS3), which is also referred to as unlicensed carrier or Licensed-Assisted Access (LAA). Examples of DRS signals include PSS/SSS/CRS transmitted in a DRS measurement timing configuration (DMTC) with periodicity of 40, 80 or 160 ms. Other periodic signals for other measurements not described here, but which fulfil the power-of-two relation to other signal set periodicities and MGRP may be accounted in the above equation in a similar manner.

The GURP comprises J=GURP/MGRP measurement gaps, denoted by index j={0, 1, . . . J−1}, each separated by duration MGRP. The respective gap(s) in the GURP for which a particular measurement activity is a candidate depends on the period and the offset of the signals used to conduct the particular measurements, and further on the time reference assumed for the start of the GURP. For simplicity of explanation, we assume that the GURP time reference is the border of system frame number 0, such that this time reference is aligned with the time reference used for configured measurement offsets. Accordingly, in some embodiments, the operations of block 720 can include the operations of sub-block 722, where the UE can determine a set of measurement gaps over the duration of the analysis period.

After selecting the analysis period (e.g., GURP) in block 720, in block 730 the UE can determine measurement load information related to each of the first and second groups within one or more measurement gaps comprising the analysis period. For example, the UE can determine this measurement load information in various ways. In general, for each of the J measurement gaps in the analysis period, the UE can determine which of the plurality of measurement activities (denoted by index i) are competing for using the $j^{th}$ gap. For example, some of the J gaps in the GURP may be used by more measurement activities than others, and certain gaps may not be used by any measurement activity at all.

The actual distribution of candidate measurement activities across the respective gaps depends on the SMTC periods relative to the MGRP, and on the SMTC offsets relative to the measurement gap offset. For example, if a set of periodic signals has an SMTC=80 ms and MGRP=40 ms, every second measurement gap can be used for that particular measurement activity. If the analysis period is determined as 80 ms, the particular one of the (J=2) gaps used in that period is determined by the relative offset between the SMTC and the measurement gap, as well as the reference point used for the analysis period. Even so, the reference point (time reference) for the analysis period is not as important so long as the sets of periodic signals and the measurement gap pattern use the same reference point (e.g., border of system frame number 0 as briefly mentioned above, or any other system frame number value).

The measurement load information can be determined and/or represented in various ways. For example, it can be determined as the number of mutually exclusive measurement activities that are candidates for using each respective gap j of the J gaps. Alternatively, it can be determined as a list of the measurement activities that are candidates of using each respective gap j of the J gaps. In other embodiments, it can be determined as some combination of the above representations.

In some embodiments, if a set of periodic signals associated with a measurement activity i at least partially overlaps a particular measurement gap j, the measurement activity can be considered as a candidate user of that gap. In other embodiments, the overlap may be required to meet a threshold amount for measurement activity i to be a candidate for gap j. In some embodiments, the UE can determine the measurement load information by stepping through the J gaps in the GURP, and for each gap determining a start time and an end time of the net gap, where the time interval between the start time and the end time constitutes the MGL minus one radio switching margin (RSM) at the beginning and one radio switching margin at the end of the gap. The radio switching margin can be specified in 3GPP standards or used as an agreed assumption when determining load information, or it may be known from the design of the particular UE hardware and software. The radio switching margin can be particular to a frequency range, e.g., 0.5 ms for FR1 (sub-6 GHz) and 0.25 ms for FR2 (above 24 GHz).

In other words, the UE can determine the start time and end time of measurement gap j in the GURP according to the above description as:

$$T\_start(j)=\text{MGoffset}+j*\text{MGRP}+\text{RSM},$$

$$T\_end(j)=\text{MGoffset}+j*\text{MGRP}+\text{MGL}-\text{RSM},$$

where T_start(j) and T_end(j) are the start and end times of the j:th measurement gap in the GURP, MGoffset is the measurement gap offset, MGRP is the measurement gap repetition period, MGL is the measurement gap length, and RSM is the radio switching margin. For example, the MGoffset can be used to shift the position of the measurement gap pattern by some fraction of a millisecond, as discussed above.

The GURP also comprises R=GURP/SMTCperiod repetitions for a particular set of periodic signals configured with an SMTCperiod. For a particular repetition r of a particular set of periodic signals, the UE can determine start and end times for that particular repetition according to:

S_start(r)=SMTCoffset+r*SMTCperiod

S_end(r)=SMTCoffset+r*SMTCperiod+SMTCwindow where S_start(r) and S_end(r) are the start and end times for the r:th repetition of the set of signals over the GURP, SMTCoffset is the SMTC offset, SMTCwindow is the SMTC window length, and r={0, 1, . . . R−1}.

In some embodiments, if any parts of the intervals [S_start(r), S_end(r)], r={0, 1, . . . R−1}, overlaps the jth measurement gap interval [T_start(j), T_end(j)], then the measurement activity associated with this set of periodic signals is a candidate user of the j:th measurement gap in the GURP. In other embodiments, the overlap may be required to meet a threshold amount for measurement activity i to be a candidate for gap j.

A measurement period can be specified according to a fundamental measurement interval that is applicable only when a single measurement activity is using a measurement gap pattern. For example, the 480 ms L1 measurement period used in E-UTRA for RSRP and RSRQ measurements is a fundamental measurement interval. Another example is the cell detection delay time used for inter-frequency cell identification in E-UTRA, i.e., $$T_{Basic\_Identify\_Inter} \cdot \frac{480}{T_{Inter1}}.$$

Nevertheless, when multiple measurement activities compete r the same measurement gap resources, it will take longer time for each respective measurement activity to acquire the requisite number of snapshots (samples) needed to meet the associated performance requirement for measurement accuracy or detection reliability. As such, when there is more than one measurement activity using the measurement gap pattern, measurement periods longer than the associated fundamental measurement intervals can be expected. The resulting longer measurement periods can be considered as scaled versions of the corresponding fundamental measurement intervals.

For a plurality of M measurement activities to be performed (e.g., the total comprising the first group and second group), each measurement activity is denoted with index i, where i={0 . . . M−1}. As mentioned above, each measurement gap in the GURP is denoted with index j, where j={0 . . . J−1}. For each measurement activity i and measurement gap j, the parameter $\lambda_{i,j}=1$ when the measurement activity is a candidate user of measurement gap j, and $\lambda_{i,j}=0$ otherwise (then there is nothing to be measured). The parameter $\lambda_{i,j}$ shows how many measurement objects are competing in respective measurement gap in the GURP.

In some embodiments, the operations of block 730 can include the operations of sub-block 732, where the UE can, for each particular measurement gap of the set (e.g., determined in sub-block 722), determine a total number of measurements of the first group that overlap the particular measurement gap, and a total number of measurements of the second group that overlap the particular measurement gap. For example, the first group of measurements can include intra-frequency measurements (e.g., measurement objects), and the second group of measurements can include inter-frequency and/or inter-radio access technology (inter-RAT) measurements (e.g., measurement objects).

In such embodiments, the measurement load information can comprise the number of intra-frequency measurement objects and the number of inter-frequency/inter-RAT measurement objects competing for the same measurement gap j. The measurement load information for the j:th measurement gap in the GURP can be expressed as:

$$N_{intra,j} = \sum_{i=0}^{Nfreq-1} \lambda_{i,j} X_i,$$

where $X_i = \begin{cases} 1 & \text{if carrier } i \text{ is intra-frequency carrier} \\ 0 & \text{otherwise} \end{cases}$ $$N_{inter,j} = \sum_{i=0}^{Nfreq-1} \lambda_{i,j} Y_i,$$

where $Y_i = \begin{cases} 1 & \text{if carrier } i \text{ is inter-frequency or inter-RAT carrier} \\ 0 & \text{otherwise} \end{cases}$ In block 740, the UE can determine, based on the measurement load information and the gap-sharing ratio (e.g., X), a measurement schedule for the first and second groups of measurements. In some embodiments in which the received measurement configuration includes an index relating to one or more tables of gap-sharing ratio values (e.g., Tables 5 and 6-1 through 6-3 above), the operations of block 740 can include the operations of sub-block 742, where the UE can select the gap-sharing ratio from one of the tables based on the index (e.g., such as described above in relation to these tables). In some embodiments, the operations of block 740 can also include the operations of sub-block 741, where the UE can select a one of a plurality of tables, and then select the gap-sharing ratio (e.g., X) from the selected table based on the index. For example, the UE can select the table based on a degree of overlap between the first group of measurements and the second group of measurements. These embodiments are described in more detail below. More specifically, the schedule determined in block 740 can be based on the following assumed and/or known information:

- X % of intra-frequency measurements and (100−X) % of inter-frequency/inter-RAT measurements are performed in gap j, based on gap-sharing factor X;
- within the set of $N_{intra,j}$ intra-frequency measurements in gap j, all intra-frequency carriers are measured with equal effort; and
- within the set of $N_{intrer,j}$ inter-frequency/inter-RAT measurements, all inter-frequency/inter-RAT carriers are assumed to be measured with equal effort.

In some embodiments, the UE can determine the measurement schedule in block 740 according to various operations shown in sub-blocks 743-747. For example, in sub-block 743, the UE can select a reference interval, which can be an integer multiple of GURP determined in block 730, for gap usage determination. This reference interval can contain multiple instances of each gap j, since the gap numbering goes from j=0 . . . (GURP/MGRP)−1 and then repeats from zero. In sub-block 744, the UE can determine a set of measurement gaps, within the reference interval, in which the total number of measurements of the first group and the total number of measurements of the second group are non-zero, e.g., each instance of gap j having $N_{intra,j} \geq 1$ and $N_{inter,j} \geq 1$. In sub-block 745, for the gaps in the determined set, the UE can determine a measurement schedule such that the gap sharing is done according to the configured gap sharing ratio, X For example, if X=50%, then half of the instances of gap j may be used for inter-frequency measurement and half of the instances of gap j may be used for inter-frequency/interRAT measurement. Within the set of $N_{intra,j}$ intra-frequency measurements, all carriers are measured with equal effort, and within the set of $N_{intrer,j}$ inter-frequency/inter-RAT measurements, all carriers are measured with equal effort or equal share, according to the assumption discussed above. This operation is represented in FIG. 7 by sub-block 747.

In some embodiments, the UE can further schedule measurement activities during other gaps in the reference period (e.g., where $N_{intra,k}=0$ or $N_{inter,k}=0$, denoted as gaps k, k≠j) without consideration of the gap-sharing ratio. This operation is represented in FIG. 7 by sub-block 746. In such embodiments, the UE can also adjust its usage of gaps j according to these further scheduled measurement activities, such that the overall balance of intra-frequency and inter-frequency measurements over the reference period is according to the configured gap sharing ratio X. Potentially, $N_{intra,k} \neq N_{intra,j}$ and $N_{intra,k} \neq N_{inter,j}$ which the UE can take into account in the schedule determination.

In some embodiments, the exemplary method and/or procedure shown in FIG. 7 can also include the operation of block 750, in which the UE can perform the first and second groups of measurements according to the determined schedule.

Figure 8:
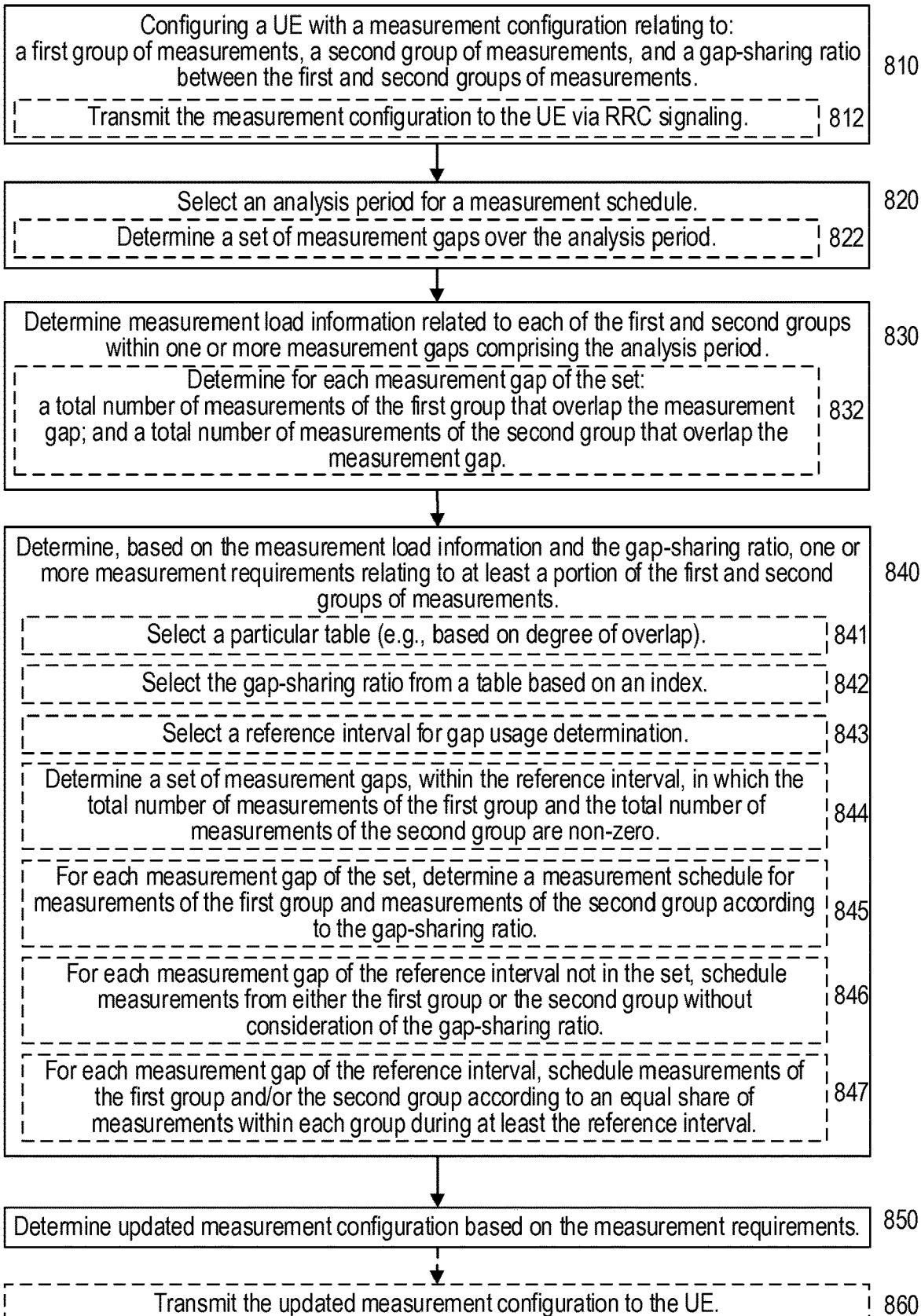
FIG. 8 is a flow diagram of an exemplary method and/or procedure performed by a network node for configuring a particular UE to perform a plurality of measurement activities, according to various exemplary embodiments of the present disclosure.

FIG. 8 is a flow diagram of an exemplary method and/or procedure for configuring a user equipment (UE, e.g., wireless device, or component thereof such as a modem) to perform a plurality of measurement activities, according to various exemplary embodiments of the present disclosure. The exemplary method and/or procedure shown in FIG. 8 can be performed by a serving network node (e.g., eNB, gNB, ng-eNB, en-gNB, base station, etc., or component thereof) in communication with a UE in a wireless network, as shown in or described in relation to other figures herein. Furthermore, the exemplary method and/or procedure shown in FIG. 8 can be utilized cooperatively with the exemplary method and/or procedure shown in FIG. 7 to achieve exemplary benefits described herein. Although FIG. 8 shows blocks in a particular order, this order is merely exemplary and the operations shown in FIG. 8 can be performed in a different order than shown, and can be combined and/or divided into blocks having different functionality. Optional operations are indicated by dashed lines.

In block 810, the network node can configure a UE with a measurement configuration relating to: a first group of measurements (e.g., SMTCs for infra-frequency measurements), a second group of measurements (e.g., SMTCs for inter-frequency and/or inter-RAT measurements), and a gap-sharing ratio (e.g., X) between the first and second groups of measurements. In some embodiments, the measurement configuration can also include a measurement gap repetition period (MGRP) relating to gaps for performing the first and second groups of measurements. In some embodiments, the measurement configuration can include an index relating to one or more tables, each table comprising a plurality of gap-sharing ratio values. In some embodiments, the network node can send the measurement configuration via Radio Resource Control (RRC) signaling to the UE. More generally, embodiments of the measurement configuration operation of block 810 can be substantially identical to embodiments discussed above in relation to FIG. 7 (e.g., block 710).

In block 820, the network node can select an analysis period for a measurement schedule. For example, the network node can select and/or determine an analysis period (also referred to hereinabove as GURP) using at least the same exemplary techniques as discussed above with respect to FIG. 7 (e.g., block 720).

After selecting the analysis period in block 820, in block 830 the network node can determine measurement load information related to each of the first and second groups within one or more measurement gaps comprising the analysis period. For example, the network node can determine the measurement load information using at least the same exemplary techniques as discussed above with respect to FIG. 7 (e.g., block 730).

In block 840, the network node can determine, based on the measurement load information and the gap-sharing ratio, X, one or more measurement requirements relating to at least a portion of measurements comprising the first and second groups.

In some embodiments, the requirement(s) determination in block 840 can be further based on the following assumed and/or known information:

X % of intra-frequency measurements and (100–X) % of inter-frequency/inter-RAT measurements are performed in gap j, based on gap-sharing factor X;

within the set of $N_{intra,j}$ intra-frequency measurements in gap j, all intra-frequency carriers are measured with equal effort; and within the set of $N_{intrer,j}$ inter-frequency/inter-RAT measurements, all inter-frequency/inter-RAT carriers are assumed to be measured with equal effort.

In general terms, the network node can determine the one or more measurement requirements using operations similar to those described above with respect to block 740 of FIG. 7. This is represented in FIG. 8 by sub-blocks 841-847, whose operations correspond to respective sub-blocks 741-747 described above with respect to FIG. 7.

In some embodiments, the requirement(s) determined in block 840 can include at least one of the following for the respective measurement activities (e.g., on respective carrier frequencies) comprising the first group and the second group (e.g., configured in block 810):

Measurement period for carrier i

SSB detection interval for carrier i

SSB time index reading delay for carrier i

Scaling factor for RRM delays due to multi-carrier measurement, e.g., a ratio of RRM delay when carrier i configured for measurement together with other carriers (e.g., by gap sharing), to the RRM delay when only carrier i configured for measurements.

In some embodiments, the intra-frequency measurement time (e.g., NR cell detection delay, L1 measurement period of identified cell, etc.) can be scaled based on a scaling factor. For example, if all SMTCs of intra-frequency and inter-frequency carriers overlap, then the intra-frequency measurement time can be scaled by a scaling factor $K_{intra}=100/X$ such that $K_{inter}=Nfreq*100/(100-X)$. Examples of scaling of intra-frequency measurement time is given below (in ms units):

$$T_{identiy\_intra\_without\_index} = K_{intra} * (T_{PSS/SSS\_sync} + T_{SSB\_measurement\_period})$$

$$T_{identify\_intra\_with\_index} = K_{intra} * (T_{PSS/SSS\_sync} + T_{SSB\_measurement\_period} + T_{SSB\_time\_index})$$

where $T_{SSB\_measurement\_period} = K_{intra} * \max(200.5 * \max(MGRP, SMTC\ period))$ in the case of no discontinuous reception (DRX) cycle or DRX cycle<MGRP.

In another example where some of SMTCs of intra-frequency and inter-frequency carriers do not overlap, the scaling factor $K_{intra}$ is applied only on the subset of SMTC that are overlapping. This exemplary scenario can be illustrated by the following numerical example:

F1: Intra-frequency NR layer, 40 ms SMTC period, 0 ms offset

F2: Inter-frequency NR layer, 80 ms SMTC period, 0 ms offset

Gap pattern: GP0 (MGRP=40 ms, ML=6 ms, 0 ms offset) GURP=80 ms

For intra-frequency (F1) measurements: $\lambda_{F1,0}=1$; $\lambda_{F1,1}=1$ (all gaps may be used)

For intra-frequency (F2) measurements: $\lambda_{F1,0}=1$; $\lambda_{F1,1}=0$ (one gap per two may be used)

For the first gap in the gap sequence (i.e., j=0), gap sharing is applied since both F1 and F2 are candidates to be measured. However, for the second gap in the gap sequence (i.e., j=1), gap sharing is not applied since only F1 is a candidate to be measured. If X="equal share" is configured for gap sharing (i.e., in gap j=0), then the overall scaling factor $N_{freq,intra}=2/(0.5+1)\approx 1.33333$ and the overall scaling factor $N_{freq,inter}=1/(0.5+0)=2$.

On the other hand, if "X=75%" is configured for gap sharing (i.e., in gap j=0), then the overall scaling factor $N_{freq,intra}=2/(0.75+1)\approx 1.1428$ and the overall scaling factor $N_{freq,inter}=2/(0.25+0)=4$. Similarly, if "X=20%" is configured for gap sharing (i.e., in gap j=0), then the overall scaling factor $N_{freq,intra}=2/(0.20+1)\approx 1.667$ and the overall scaling factor $N_{freq,inter}=2/(0.80+0)=1.25$. More generally, for this configuration with any given X value, the overall scaling factors $N_{freq,intra}=2/((X/100)+1)$ and $N_{freq,inter}=2/((100/(100-X))$.

Accordingly, intra-frequency measurement requirements can be determined based on scaling by $N_{freq,intra}$ as determined above (in ms units):

$$T_{identify\_intra\_without\_index} = N_{freq,intra} * (T_{PSS/SSS\_sync} + T_{SSB\_measurement\_period}),$$

$$T_{identify\_intra\_with\_index} = N_{freq,intra} * (T_{PSS/SSS\_sync} + T_{SSB\_measurement\_period} + T_{SSB\_time\_index}),$$

where $T_{SSB\_measurement\_period} = N_{freq,intra} * \max(200,5 * \max(MGRP, SMTC\ period))$ in the case of no discontinuous reception (DRX) cycle or DRX cycle<MGRP. Similarly, inter-frequency measurement requirements can be determined based on scaling by $N_{freq,intra}$ as determined above (in ms units):

$$T_{identify\_inter\_without\_index} = N_{freq,inter} * (T_{PSS/SSS\_sync,inter} + T_{SSB\_measurement\_period,inter}),$$

$$T_{identify\_inter\_with\_index} = N_{freq,inter} * (T_{PSS/SSS\_sync,inter} + T_{SSB\_measurement\_period,inter} + T_{SSB\_time\_index,inter}),$$

where $T_{SSB\_measurement\_period} = N_{freq,intra} * \max(TBD, TBD * \max(MGRP, SMTC\ period))$.

In block 850, the network node can determine updated measurement configurations for the UE based on the one or more measurement requirements, determined in block 840, for the plurality of measurement activities. The updated measurement configurations can include at least a portion of the initial measurement configurations sent to the UE in block 810. For example, the operations in block 850 can be performed when one or more of the measurement requirements determined in block 840 differs from one or more corresponding previous measurement requirements by a threshold amount, such that an updated measurement configuration is necessary and/or desirable.

The network node can determine updated measurement configurations by modifying various parameters comprising and/or related to the initial measurement configurations including, but not limited to:

Reducing/increasing transmission periodicity of the measured signals,

Reducing/increasing measurement gap periodicity,

Reducing/increasing measurement periodicity,

Reducing/increasing measurement window (e.g., SMTC or DRS) periodicity,

Reducing/increasing load in measurement gaps (e.g., configure other gaps or ensure some of the measurements can be performed without gaps), and/or Configuring absolute or relative offsets for the measurements to control whether and how many measurements compete in each gap.

In some embodiments, in block 860, the network node can also transmit the updated measurement configurations to the UE.

Although the description above is based on embodiments utilizing SSB-based measurements, the same principles can be applied to CSI-RS based measurements. Since CSI-RS measurement will use SSB of the same or a different carrier as a time reference, if there is an Y ms time window for SMTC, the CSI-RS will likely also occur within an Y ms window. In other words, the UE will know accurate timing info for the CSI-RS once it detects at least one SSB based on the CSI-RS configuration, so it does not need to search for CSI-RS over a Y ms window. Hence, within measurement gaps the UE may need to determine whether to measure intra-frequency CSI-RS or inter-frequency/inter-RAT CSI-RS, so it can use the corresponding sharing ratio in a similar manner as described above.

Although the description above is based on embodiments utilizing sharing between gap-based intra-frequency (e.g., "type C") and gap-based inter-frequency/inter-RAT (e.g., "type D") measurements, the same principles can be applied to sharing between intra-frequency "type A" and type D measurements, or between intra-frequency "type B" and type D measurements. The difference is that an explicit gap configuration is not needed for type A or type B measurement to be performed. Nevertheless, if type A or B measurements are coincidental with a measurement gap, the gap sharing principles described above can be applied.

Furthermore, these gap-sharing principles can be applied more generally to any two groups of measurements that need to be performed in measurement gaps. For example, a first group can comprise any one or more measurements on serving carriers including carrier frequency of the primary cell (PCell), secondary cell (SCell), and primary serving cell (PSCell); and the second group can comprise any one or more measurements not included in the first group, such as inter-frequency and inter-RAT measurements. As such, for gaps in which measurements of both groups can be performed, the sharing factor can be applied, according to principles describe herein, to control the share of gaps for each of the groups, taking into account gaps where measurements of a single group can be performed.

As one example of the general application of these principles, the first and the second groups of measurements comprise only periodic measurements. In another example, the first and the second groups of measurements may comprise any one or both periodic type and aperiodic type of measurements. Furthermore, the sharing may be applicable over a certain time period ('share period'), which may be pre-defined, configurable, or determined based on a rule such as the longest periodicity Tmax of the periodicities of measurements from both of the groups. Alternately, the share period can be determined based on a function of Tmax (e.g., q*Tmax where q>=1).

Moreover, these gap-sharing principles can be applied more generally to more than two groups of measurements, in which case the shares would need to be defined for any combination of the groups that may occur in a gap. For example, given three groups, there can be defined a share X12 between group1 and group 2, a share X23 between group 2 and group 3, a share X13 between group 1 and group 3, and a share X123 between groups 1, 2, and 3. Each share Xij may be defined in a similar manner as those described above for the two groups.

Based on the application of the sharing principles, in each gap the UE can determine and/or schedule measurements from a particular group to be performed, based on the groups of measurements applicable for the concerned gap. In one example, the UE may run a counter for gaps associated with each share Xij during each period of the share Xij, and perform one or more measurements from the first group in X % first gaps during the share period and then perform one or more measurements from the second group in the remaining (100–X) % of gaps during the rest of the share period Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 9:
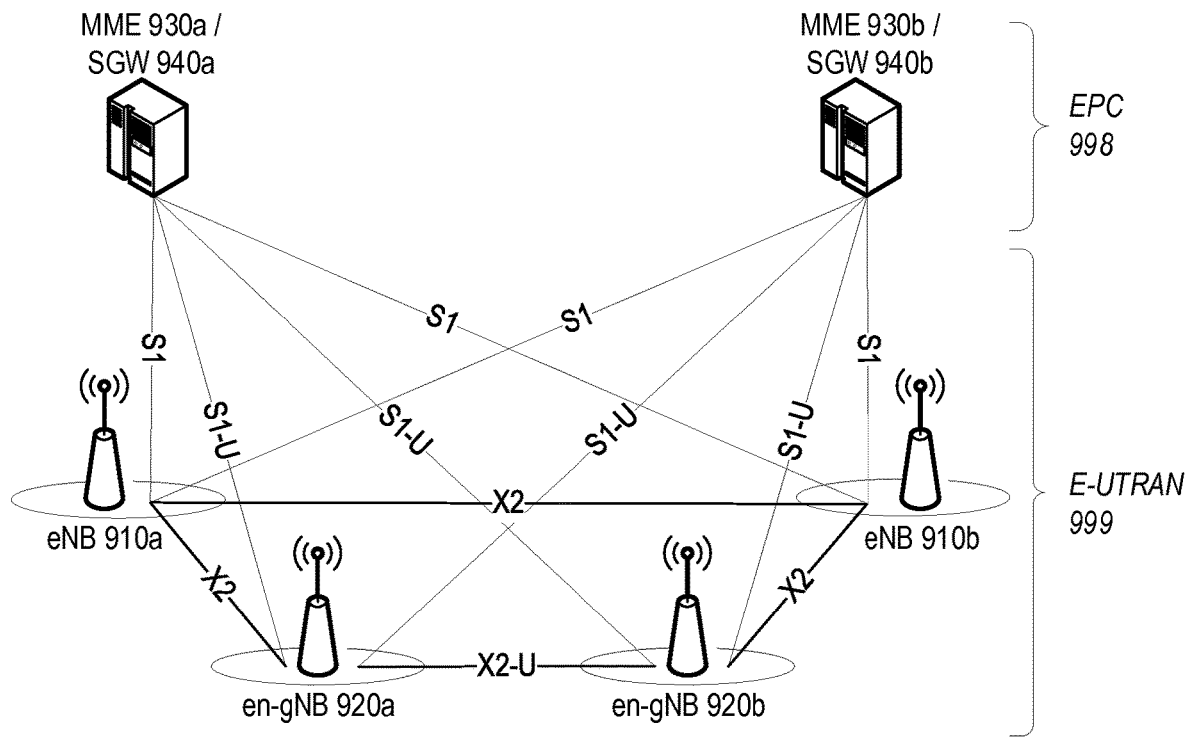
FIG. 9 shows a high-level view of an exemplary LTE network architecture, including a Evolved UTRAN (E-UTRAN) and an Evolved Packet Core (EPC), according to various exemplary embodiments of the present disclosure.

FIG. 9 shows a high-level view of an exemplary LTE network architecture, including an Evolved UTRAN (E-UTRAN) 999 and a Evolved Packet Core (EPC) 998. As shown in the figure, E-UTRAN 999 can include eNBs 910 (e.g., 910a,b) and en-gNBs 920 (e.g., 920a,b) that are interconnected via respective X2 or X2-U interfaces, as the case may be. The eNBs and en-gNBs are also connected via S1 (or S1-U) interfaces to EPC 998. In general, E-UTRAN 999 is responsible for all radio-related functions in the network, including radio bearer control, radio admission control, radio mobility control, scheduling, and dynamic allocation of resources to UEs in uplink and downlink, as well as security of the communications with the UE. These functions reside in the individual radio nodes, such as eNBs 910a,b and en-gNBs 920a,b.

Collectively, the MME/S-GW handles both the overall control of the UE and data flow between the UE and the rest of the EPC. More specifically, however, the MME processes the signaling protocols between the UE and the EPC, which are known as the Non-Access Stratum (NAS) protocols. On the other hand, the S-GW handles all Internet Protocol (IP) data packets between the UE and the EPC, and serves as the local mobility anchor for the data bearers when the UE moves between individual radio nodes, such as eNBs 910a,b and en-gNBs 920a,b.

Each of the eNBs 910 can support the LTE radio interface, including frequency division duplexing (FDD), time division duplexing (TDD), or a combination thereof. In contrast, each of en-gNBs 920 supports the NR radio interface but connect to the EPC via the S1-U interface. In addition, the eNBs 910 and en-gNBs 920 can provide multi-RAT (radio access technology) dual connectivity (MR-DC) to UEs as described above, including E-UTRAN/NR Dual Connectivity (EN-DC).

Figure 10:
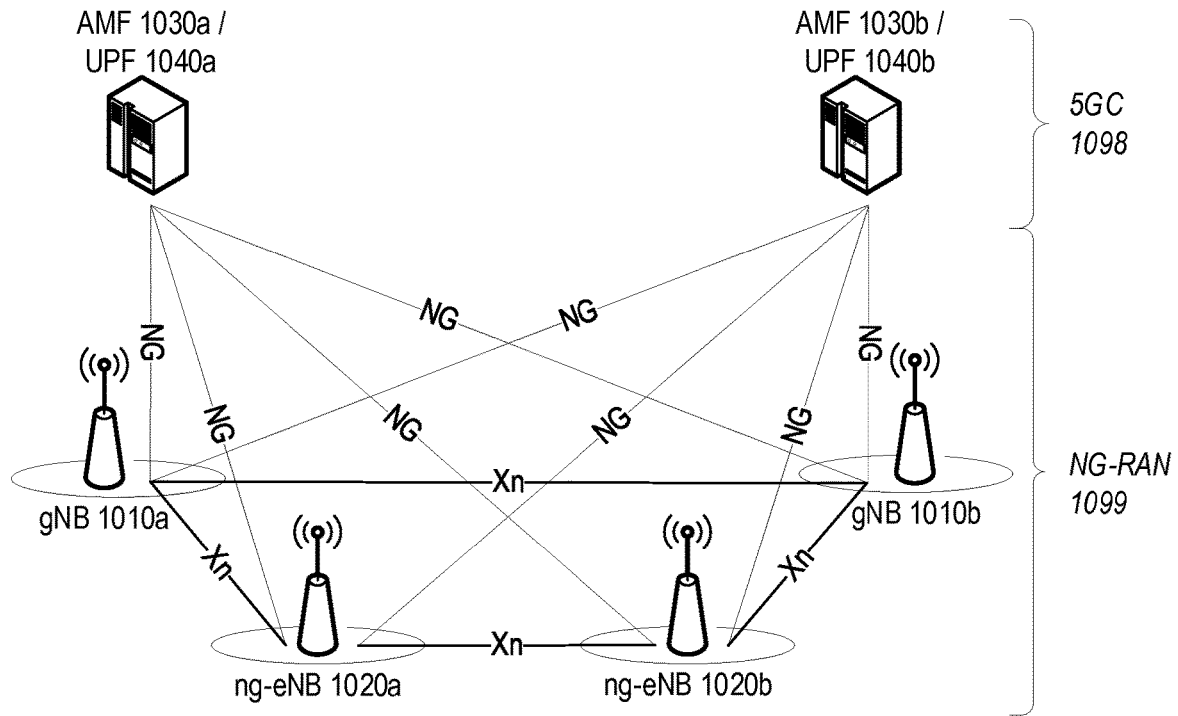
FIG. 10 shows a high-level view of an exemplary 5G network architecture, including a Next Generation Radio Access Network (NG-RAN) and a 5G Core (5GC), according to various exemplary embodiments of the present disclosure.

FIG. 10 shows a high-level view of an exemplary 5G network architecture, including a Next Generation Radio Access Network (NG-RAN) 1099 and a 5G Core (5GC) 1098. As shown in the figure, NG-RAN 1099 can include gNBs 1010 (e.g., 1010a,b) and ng-eNBs 1020 (e.g., 1020a,b) that are interconnected with each other via respective Xn interfaces. The gNBs and ng-eNBs are also connected via the NG interfaces to 5GC 1098, more specifically to the AMF (Access and Mobility Management Function) 1030 (e.g., AMFs 1030a,b) via respective NG-C interfaces and to the UPF (User Plane Function) 1040 (e.g., UPFs 1040a,b) via respective NG-U interfaces.

NG-RAN 1099 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

Each of the gNBs 1010a,b can support the NR radio interface, including frequency division duplexing (FDD), time division duplexing (TDD), or a combination thereof. In contrast, each of ng-eNBs 1020a,b supports the LTE radio interface but, unlike conventional LTE eNBs (e.g., eNBs 910a,b shown in FIG. 9), connect to the 5GC via the NG interface. In addition, the gNBs 1010a,b and ng-eNBs 1020a,b can provide multi-RAT (radio access technology) dual connectivity (MR-DC) to UEs as described above, including NG-RAN E-UTRA/NR Dual Connectivity (NGEN-DC).

Each of the gNBs 1010a,b can include a central (or centralized) unit (CU or gNB-CU) and one or more distributed (or decentralized) units (DU or gNB-DU). Likewise, each of the en-gNBs 920a,b shown in FIG. 9 can include a CU and one or more DUs. The CUs are logical nodes that host higher-layer protocols and perform various gNB functions such controlling the operation of DUs. Similarly, the DUs are logical nodes that host lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 11:
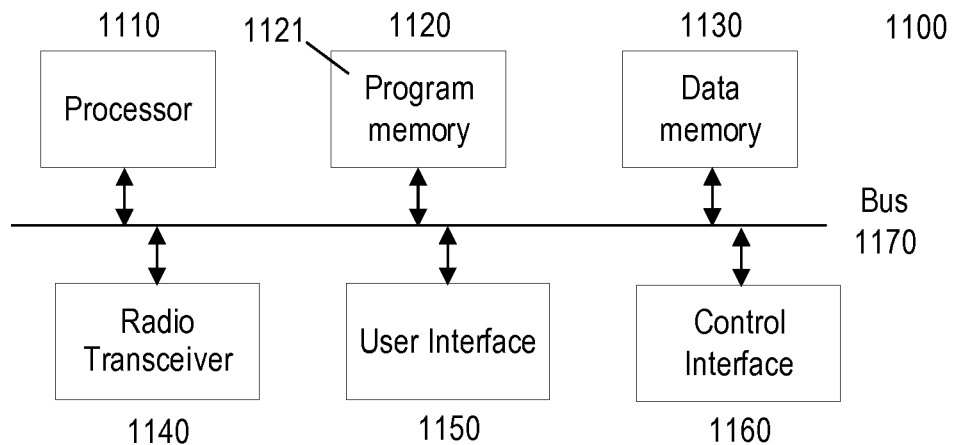
FIG. 11 is a block diagram of an exemplary wireless device or user equipment (UE), according to various exemplary embodiments of the present disclosure.

FIG. 11 shows a block diagram of an exemplary wireless device or user equipment (UE) 1100 configurable according to various exemplary embodiments of the present disclosure, including execution of instructions on a computer-readable medium that correspond to operations of one or more exemplary methods and/or procedures described herein above.

Exemplary device 1100 can comprise a processor 1110 that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) executed by processor 1110 that can configure and/or facilitate device 1100 to perform various operations, including operations described below. For example, program memory 1120 can store software code or program executed by processor 1110 that facilitates, causes and/or programs exemplary device 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or host interface 1160.

For example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1120 can also store software code executed by processor 1110 to control the functions of device 1100, including configuring and controlling various components such as radio transceiver 1140, user interface 1150, and/or host interface 1160. Program memory 1120 can also store one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 1120 can comprise an external storage arrangement (not shown) remote from device 1100, from which the instructions can be downloaded into program memory 1120 located within or removably coupled to device 1100, so as to enable execution of such instructions.

Data memory 1130 can comprise memory area for processor 1110 to store variables used in protocols, configuration, control, and other functions of device 1100, including operations corresponding to, or comprising, any of the exemplary methods and/or procedures described herein. Moreover, program memory 1120 and/or data memory 1130 can comprise non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed. Persons of ordinary skill in the art will recognize that processor 1110 can comprise multiple individual processors (including, e.g., multi-core processors), each of which implements a portion of the functionality described above. In such cases, multiple individual processors can be commonly connected to program memory 1120 and data memory 1130 or individually connected to multiple individual program memories and/or data memories. More generally, persons of ordinary skill in the art will recognize that various protocols and other functions of device 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1140 can comprise radio-frequency transmitter and/or receiver functionality that facilitates the device 1100 to communicate with other equipment supporting like wireless communication standards and/or protocols. In some exemplary embodiments, the radio transceiver 1140 includes a transmitter and a receiver that enable device 1100 to communicate with various 5G/NR networks according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures. In some exemplary embodiments, the radio transceiver 1140 can comprise some or all of the receiver functionality shown in and described above with reference to FIG. 5.

In some exemplary embodiments, the radio transceiver 1140 includes an LTE transmitter and receiver that can facilitate the device 1100 to communicate with various LTE LTE-Advanced (LTE-A), and/or NR networks according to standards promulgated by 3GPP. In some exemplary embodiments of the present disclosure, the radio transceiver 1140 includes circuitry, firmware, etc. necessary for the device 1100 to communicate with various 5G/NR, LTE, LTE-A, UMTS, and/or GSM/EDGE networks, also according to 3GPP standards. In some exemplary embodiments of the present disclosure, radio transceiver 1140 includes circuitry, firmware, etc. necessary for the device 1100 to communicate with various CDMA2000 networks, according to 3GPP2 standards.

In some exemplary embodiments of the present disclosure, the radio transceiver 1140 is capable of communicating using radio technologies that operate in unlicensed frequency bands, such as IEEE 802.11 WiFi that operates using frequencies in the regions of 2.4, 5.11, and/or 110 GHz. In some exemplary embodiments of the present disclosure, radio transceiver 1140 can comprise a transceiver that is capable of wired communication, such as by using IEEE 802.3 Ethernet technology. The functionality particular to each of these embodiments can be coupled with or controlled by other circuitry in the device 1100, such as the processor 1110 executing program code stored in program memory 1120 in conjunction with, or supported by, data memory 1130.

User interface 1150 can take various forms depending on the particular embodiment of device 1100, or can be absent from device 1100 entirely. In some exemplary embodiments, user interface 1150 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the device 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1100 having a touch screen display are capable of receiving user inputs, such as inputs related to exemplary methods and/or procedures described herein or otherwise known to persons of ordinary skill in the art.

In some exemplary embodiments of the present disclosure, device 1100 can comprise an orientation sensor, which can be used in various ways by features and functions of device 1100. For example, the device 1100 can use outputs of the orientation sensor to determine when a user has changed the physical orientation of the device 1100's touch screen display. An indication signal from the orientation sensor can be available to any application program executing on the device 1100, such that an application program can change the orientation of a screen display (e.g., from portrait to landscape) automatically when the indication signal indicates an approximate 110-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the device 1100 can take various forms depending on the particular exemplary embodiment of device 1100 and of the particular interface requirements of other devices that the device 1100 is intended to communicate with and/or control. For example, the control interface 1160 can comprise an RS-232 interface, an RS-485 interface, a USB interface, an HDMI interface, a Bluetooth interface, an IEEE 11114 ("Firewire") interface, an $I^2C$ interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the device 1100, including various exemplary methods and/or computer-readable media according to various exemplary embodiments of the present disclosure.

Figure 12:
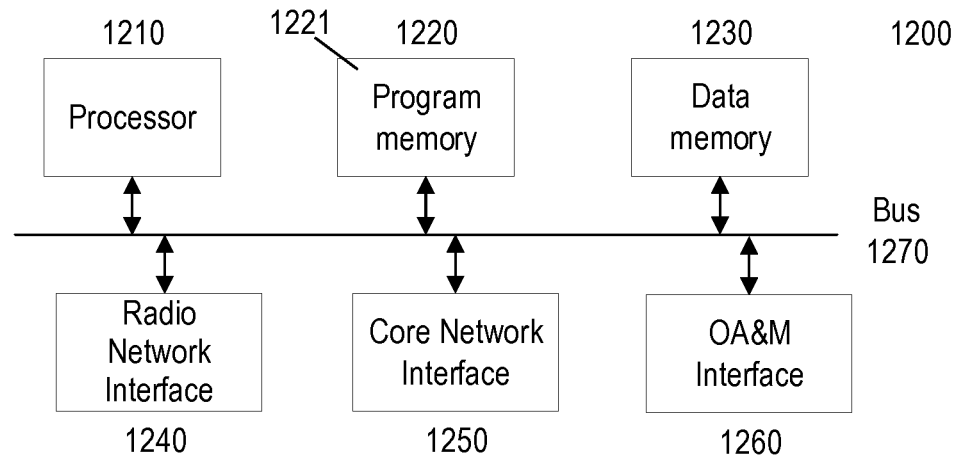
FIG. 12 is a block diagram of an exemplary network node (e.g., a base station, eNB, or gNB), according to various exemplary embodiments of the present disclosure.

FIG. 12 shows a block diagram of an exemplary network node 1200 configurable according to various embodiments of the present disclosure, including those described above with reference to other figures. In some exemplary embodiments, network node 1200 can comprise a base station, eNB, gNB, or component thereof. Network node 1200 comprises processor 1210 which is operably connected to program memory 1220 and data memory 1230 via bus 1270, which can comprise parallel address and data buses, serial ports, or other methods and/or structures known to those of ordinary skill in the art. In some exemplary embodiments, processor 1210 can comprise some or all of the functionality of processor 500 shown in FIG. 5 and discussed in more detail above.

Program memory 1220 can store software code, programs, and/or instructions (collectively shown as computer program product 1221 in FIG. 12) executed by processor 1210 that can configure and/or facilitate network node 900 to communicate with one or more other devices using protocols according to various embodiments of the present disclosure, including one or more exemplary methods and/or procedures discussed above. Program memory 1220 can also store software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. Program memory 1220 can also store software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can comprise multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill in the art will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some exemplary embodiments, core network interface 1250 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

By way of example and without limitation, core network interface 1250 can comprise one or more of the S1, S1-U, and NG interfaces standardized by 3GPP. Also byway of example, radio network interface 1240 can comprise the Uu interface standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
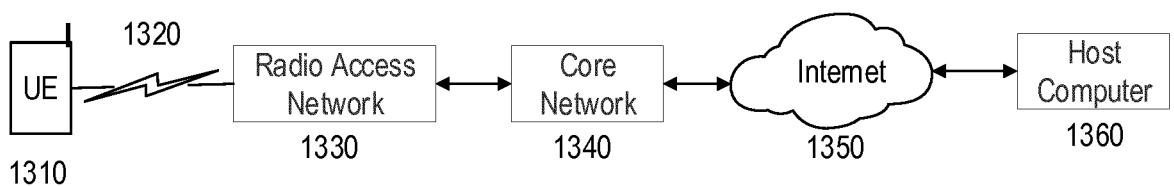
FIG. 13 is a block diagram of an exemplary network configuration usable to provide over-the-top (OTT) data services between a host computer and a user equipment, according to various exemplary embodiments of the present disclosure.

FIG. 13 is a block diagram of an exemplary network configuration usable to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. RAN 1330 can include one or more network nodes (e.g., base stations, eNBs, gNBs, ng-eNBs, en-gNBs, controllers, etc.). RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1450 described above. In some exemplary embodiments, RAN 1330 and core network 1340 can be configured and/or arranged as shown in other figures discussed above. Similarly, UE 1310 can also be configured and/or arranged as shown in other figures discussed above.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments that selectively determine a measurement schedule, for a UE, based on the UE's measurement load information and the gap-sharing ratio, as described herein, can play a critical role by enabling UE 1310 and RAN 1330 to meet the requirements of the particular OTT service between host computer 1360 and UE 1310. Various benefits can result from scheduling measurements in this manner. For example, layer-1 (L1) measurement periods and, consequently, delay until cell identification are reduced, such that suitable cells for handover or offloading can be identified more quickly. One resulting benefit is that handover can be performed before serving cell quality becomes critically low. Another resulting exemplary benefit is that cell offloading can be performed before downlink buffers in the base station overrun. By improving network performance in these and other ways, exemplary embodiments improve data throughput in a coverage area and enable a greater number of users to utilize data-intensive services such as streaming video in various coverage conditions without excessive power consumption or other degradations to user experience, such as dropped data connections caused by delayed handover due to measurement delays.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the techniques and apparatus described herein include, but are not limited to, the following enumerated examples:

1. A method performed by a user equipment (UE) to schedule a plurality of measurement activities in a wireless network, the method comprising:
    obtaining a measurement configuration relating to:
        a first group of measurements;
        a second group of measurements;
        a measurement gap pattern; and
        a gap-sharing ratio between the first and second groups of measurements;
    selecting an analysis period and determining, over the analysis period, measurement load information related to the measurement configuration; and
    determining, based on the measurement load information and the gap-sharing ratio, a measurement schedule for the first and second groups of measurements.
2. The method of embodiment 1, further comprising performing the first and second groups of measurements according to the determined measurement schedule.
3. The method of any of embodiments 1-2, wherein:
    each of the measurement activities is associated with a set of signals having at least one of a periodicity, a duration, a time offset, and a fundamental measurement interval; and
    the measurement gap pattern comprises a measurement gap repetition period (MGRP) relating to gaps for performing the first and second groups of measurement.
4. The method of embodiment 3, wherein the analysis period is selected based on a least common multiple (LCM) of the MGRP and the respective periodicities associated with the measurements comprising the first and second groups.
5. The method of any of embodiments 1-4, wherein:
    the first group of measurements comprises intra-frequency measurements; and
    the second group of measurements comprises at least one of inter-frequency and inter-radio access technology (inter-RAT) measurements.
6. The method of any of embodiments 1-5, wherein determining the measurement load information comprises:
    determining a set of measurement gaps over the duration of the analysis period;
    determining for each particular measurement gap of the set:
        a total number of measurements of the first group that overlap the particular measurement gap; and
        a total number of measurements of the second group that overlap the particular measurement gap.
7. The method of embodiment 6, wherein determining the measurement schedule comprises:
    selecting a reference interval for gap usage determination, wherein the reference interval is an integer multiple of the analysis period;
    determining a set of measurement gaps, within the reference interval, in which the total number of measurements of the first group and the total number of measurements of the second group are non-zero; and
    for each measurement gap of the determined set, determining a measurement schedule for measurements of the first group and measurements of the second group according to the gap-sharing ratio.
8. The method of embodiment 7, wherein determining the measurement schedule further comprises: for each measurement gap of the reference interval that is not a member of the determined set, scheduling measurements from one of the first group and the second group without consideration of the gap-sharing ratio.
9. The method of embodiment 8, wherein determining the measurement schedule further comprises: for each measurement gap of the reference interval, scheduling particular measurements of the first group and/or the second group according to an equal share of measurements within each group over a duration of at least the reference interval.
10. The method of any of embodiments 1-9, wherein the UE obtains the measurement configuration by receiving the measurement configuration from a network node via Radio Resource Control (RRC) signaling.
11. The method of embodiment 10, wherein the gap-sharing ratio is signaled, via RRC, as an index relating to one or more tables, each table comprising a plurality of gap-sharing ratio values.
12. The method of embodiment 11, wherein the one or more tables comprise a plurality of tables, and further comprising determining the gap-sharing ratio by:
    selecting a particular one of the plurality of tables; and
    using the index to identify a particular gap-sharing ratio value from the selected table.
13. A method performed by a network node, in a wireless communication network, to configure a user equipment (UE) to perform a plurality of measurement activities, the method comprising:
    configuring the UE with a measurement configuration relating to:
        a first group of measurements;
        a second group of measurements;

a measurement gap pattern; and
a gap-sharing ratio between the first and second groups of measurements;
selecting an analysis period and determining, over the analysis period, measurement load information related to the measurement configuration;
determining, based on the measurement load information and the gap-sharing ratio, one or more measurement requirements relating to at least a portion of the first and second groups of measurements; and
determining updated measurement configurations, for the UE, based on the one or more measurement requirements.

14. The method of embodiment 13, further comprising transmitting the updated measurement configurations to the UE.

15. The method of any of embodiments 13-14, wherein:
each of the measurement activities is associated with a set of signals having at least one of a periodicity, a duration, a time offset, and a fundamental measurement interval; and
the measurement gap pattern comprises a measurement gap repetition period (MGRP) relating to gaps for performing the first and second groups of measurement.

16. The method of embodiment 15, wherein the analysis period is selected based on a least common multiple (LCM) of the MGRP and the respective periodicities associated with the measurements comprising the first and second groups.

17. The method of any of embodiments 13-16, wherein:
the first group of measurements comprises intra-frequency measurements; and
the second group of measurements comprises at least one of inter-frequency and inter-radio access technology (inter-RAT) measurements.

18. The method of any of embodiments 13-17, wherein determining the measurement load information comprises:
determining a set of measurement gaps over the duration of the analysis period;
determining for each particular measurement gap of the set:
a total number of measurements of the first group that overlap the particular measurement gap; and
a total number of measurements of the second group that overlap the particular measurement gap.

19. The method of embodiment 18, wherein determining the one or more measurement requirements comprises:
selecting a reference interval for gap usage determination, wherein the reference interval is an integer multiple of the analysis period;
determining a set of measurement gaps, within the reference interval, in which the total number of measurements of the first group and the total number of measurements of the second group are non-zero; and
for each measurement gap of the determined set, determining a measurement schedule for measurements of the first group and measurements of the second group according to the gap-sharing ratio.

20. The method of embodiment 19, wherein determining the one or more measurement requirements further comprises: for each measurement gap of the reference interval that is not a member of the determined set, scheduling measurements from one of the first group and the second group without consideration of the gap-sharing ratio.

21. The method of embodiment 20, wherein determining the one or more measurement requirements further comprises: for each measurement gap of the reference interval, scheduling particular measurements of the first group and/or the second group according to an equal share of measurements within each group over a duration of at least the reference interval.

22. The method of any of embodiments 19-21, wherein the one or more measurement requirements is determined based on the measurement schedule.

23. The method of any of embodiments 13-22, wherein the network node configures the UE with the measurement configuration via Radio Resource Control (RRC) signaling.

24. The method of embodiment 23, wherein the gap-sharing ratio is signaled, via RRC, as an index relating to one or more tables, each table comprising a plurality of gap-sharing ratio values.

25. The method of embodiment 24, wherein the one or more tables comprise a plurality of tables, and further comprising determining the gap-sharing ratio by:
selecting a particular one of the plurality of tables; and
using the index to identify a particular gap-sharing ratio value from the selected table.

26. The method of any of exemplary embodiments 13-25, wherein the updated measurement configuration comprises at least one of the following:
reconfiguration of absolute or relative measurement offsets; and
reconfiguration of in at least one of: transmission periodicity of the measured signals, measurement gap periodicity, measurement periodicity, measurement window periodicity, and measurement gap loading.

27. A user equipment (UE) configurable to schedule a plurality of measurement activities in a wireless network, the UE comprising:
communication circuitry configured for communicating with a network node in the wireless communication network; and
processing circuitry operatively associated with the communication circuitry and configured to perform operations corresponding to the methods of any of exemplary embodiments 1-12.

28. A network node, in a wireless communication network, arranged to configure a user equipment (UE) to perform a plurality of measurement activities, the network node comprising:
communication circuitry configured for communicating with the UE; and
processing circuitry operatively associated with the communication circuitry and configured to perform operations corresponding to the methods of any of exemplary embodiments 13-26.

29. A non-transitory, computer-readable medium storing program instructions that, when executed by at least one processor comprising a user equipment (UE) operating in a wireless network, schedules a plurality of measurement activities according to operations corresponding to any of the methods of embodiments 1-12.

30. A non-transitory, computer-readable medium storing program instructions that, when executed by at least one processor comprising a network node in a wireless communication network, configures a user equipment (UE) to perform a plurality of measurement activities, according to operations corresponding to any of the methods of embodiments 13-26.

The invention claimed is:
1. A method performed by a user equipment (UE) to schedule a plurality of measurement activities in a wireless network, the method comprising:

receiving, from a network node in the wireless network, a measurement configuration relating to:
   a first group of measurements;
   a second group of measurements; and
   a gap-sharing ratio between the first and second groups of measurements;
selecting an analysis period for a measurement schedule;
determining measurement load information related to each of the first and second groups within one or more measurement gaps comprising the analysis period;
based on the measurement load information and the gap-sharing ratio, determining a measurement schedule for the first and second groups of measurements; and
performing the first and second groups of measurements, according to the determined measurement schedule, on signals received from the wireless network during the measurement gaps.

2. The method of claim 1, wherein:
each of the first group and the second group is associated with a set of signals having at least one of the following: a periodicity, a duration, a time offset, and a fundamental measurement interval;
the measurement configuration further comprises a measurement gap repetition period (MGRP) relating to gaps for performing the first and second groups of measurement; and
selecting the analysis period is based on one of the following functions of the MGRP and of the respective periodicities associated with the plurality of measurement activities: least common multiple (LCM), common multiple, or maximum.

3. The method of claim 1, wherein:
the first group of measurements comprises intra-frequency measurements; and
the second group of measurements comprises at least one of the following: inter-frequency measurements and inter-radio access technology (inter-RAT) measurements.

4. The method of claim 1, wherein:
selecting the analysis period further comprises determining a set of measurement gaps over the duration of the analysis period;
determining the measurement load information comprises determining for each particular measurement gap of the set:
   a total number of measurements of the first group that overlap the particular measurement gap; and
   a total number of measurements of the second group that overlap the particular measurement gap.

5. The method of claim 4, wherein determining the measurement schedule comprises:
selecting a reference interval for gap usage determination, wherein the reference interval is an integer multiple of the analysis period;
determining a set of measurement gaps, within the reference interval, in which the total number of measurements of the first group and the total number of measurements of the second group are non-zero; and
for each measurement gap of the determined set, determining a measurement schedule for measurements of the first group and measurements of the second group according to the gap-sharing ratio.

6. The method of claim 5, wherein determining the measurement schedule further comprises: for each measurement gap of the reference interval that is not a member of the determined set, scheduling measurements from either the first group or the second group without consideration of the gap-sharing ratio.

7. The method of claim 6, wherein determining the measurement schedule further comprises: for each measurement gap of the reference interval, scheduling at least one of the following according to an equal share of measurements during at least the reference interval: measurements of the first group, and measurements of the second group.

8. The method of claim 1, wherein:
the received measurement configuration comprises an index relating to one or more tables, each table comprising a plurality of gap-sharing ratio values; and
determining the measurement schedule comprises selecting the gap-sharing ratio from one of the tables based on the index.

9. The method of claim 8, wherein:
the one or more tables comprise a plurality of tables;
determining the measurement schedule further comprises selecting a particular one of the plurality of tables based on a degree of overlap between the first group of measurements and the second group of measurements; and
the gap-sharing radio is selected from the selected table.

10. A method performed by a network node, in a wireless communication network, to configure a user equipment (UE) to perform a plurality of measurement activities, the method comprising:
configuring the UE with a measurement configuration relating to:
   a first group of measurements;
   a second group of measurements; and
   a gap-sharing ratio between the first and second groups of measurements;
selecting an analysis period for a measurement schedule;
determining measurement load information related to each of the first and second groups within one or more measurement gaps comprising the analysis period; and
determining, based on the measurement load information and the gap-sharing ratio, one or more measurement requirements relating to at least a portion of the first and second groups of measurements; and
determining an updated measurement configuration, for the UE, based on the one or more measurement requirements.

11. The method of claim 10, further comprising transmitting the updated measurement configuration to the UE.

12. The method of claim 10, wherein:
each of the first group and the second group is associated with a set of signals having at least one of the following: a periodicity, a duration, a time offset, and a fundamental measurement interval; and
the measurement configuration further comprises a measurement gap repetition period (MGRP) relating to gaps for performing the first and second groups of measurement.

13. The method of claim 12, wherein selecting the analysis period is based on one of the following functions of the MGRP and the of respective periodicities associated with the plurality of measurement activities: least common multiple (LCM); common multiple; or maximum.

14. The method of claim 10, wherein:
the first group of measurements comprises intra-frequency measurements; and the second group of measurements comprises at least one of the following: inter-frequency measurements and inter-radio access technology (inter-RAT) measurements.

15. The method of claim 10, wherein:
selecting the analysis period comprises determining a set of measurement gaps over the duration of the analysis period; and
determining the measurement load information comprises determining for each particular measurement gap of the set:
a total number of measurements of the first group that overlap the particular measurement gap, and
a total number of measurements of the second group that overlap the particular measurement gap.

16. The method of claim 10, wherein:
the measurement configuration comprises an index relating to one or more tables, each table comprising a plurality of gap-sharing ratio values; and
determining the one or more measurement requirements comprises selecting the gap-sharing ratio from one of the tables based on the index.

17. The method of claim 15, wherein determining the one or more measurement requirements comprises:
selecting a reference interval for gap usage determination, wherein the reference interval is an integer multiple of the analysis period;
determining a set of measurement gaps, within the reference interval, in which the total number of measurements of the first group and the total number of measurements of the second group are non-zero; and
for each measurement gap of the determined set, determining a measurement schedule for measurements of the first group and measurements of the second group according to the gap-sharing ratio.

18. The method of claim 17, wherein determining the one or more measurement requirements further comprises: for each measurement gap of the reference interval that is not a member of the determined set, scheduling measurements from one of the first group and the second group without consideration of the gap-sharing ratio.

19. The method of claim 18, wherein determining the one or more measurement requirements further comprises: for each measurement gap of the reference interval, scheduling at least one of the following according to an equal share of measurements during at least the reference interval: measurements of the first group, and measurements of the second group.

20. The method of claim 17, wherein:
the one or more measurement requirements are determined based on the measurement schedule; and
the one or more measurement requirements include one or more of the following with respect to one or more carrier frequencies:
measurement period;
detection interval for synchronization signal and PBCH block (SSB);
SSB time index reading delay; and
one or more scaling factors for radio resource management (RRM) delays due to multi-carrier measurement.

21. The method of claim 10, wherein the updated measurement configuration comprises at least one of the following:
reconfiguration of absolute or relative measurement offsets; and
reconfiguration of at least one of at least one of the following: transmission periodicity of the measured signals, measurement gap periodicity, measurement periodicity, measurement window periodicity, and measurement gap loading.

22. A user equipment (UE) configured to schedule a plurality of measurement activities in a wireless network, the UE comprising:
a radio transceiver configured for communicating with a network node in the wireless communication network; and
processing circuitry operatively associated with the radio transceiver, whereby the combination of the processing circuitry and the radio transceiver is configured to perform operations corresponding to the method of claim 1.

23. A non-transitory, computer-readable medium storing computer-executable instructions that, when executed by at least one processor comprising a user equipment (UE) operating in a wireless network, configure the UE to perform operations corresponding to the method of claim 1.

24. A network node, in a wireless network, arranged to configure a user equipment (UE) to perform a plurality of measurement activities, the network node comprising:
a radio network interface configured to communicate with the UE; and
processing circuitry operatively coupled with the radio network interface, whereby the combination of the processing circuitry and the radio network interface is configured to perform operations corresponding to the method of claim 10.

25. A non-transitory, computer-readable medium storing computer-executable instructions that, when executed by at least one processor comprising a network node in a wireless network, configure the network node to perform operations corresponding to the method of claim 10.

* * * * *